(12) United States Patent
Sudoh et al.

(10) Patent No.: US 7,640,909 B2
(45) Date of Patent: *Jan. 5, 2010

(54) VEHICLE WITH VARIABLE AIR INTAKE ARRANGEMENT

(75) Inventors: Takehiko Sudoh, Shizuoka-ken (JP); Makoto Kobayashi, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/735,040

(22) Filed: Apr. 13, 2007

(65) Prior Publication Data

US 2007/0240667 A1 Oct. 18, 2007

(30) Foreign Application Priority Data

Apr. 14, 2006 (JP) ............................. 2006-111560
Sep. 20, 2006 (JP) ............................. 2006-253673

(51) Int. Cl.
 *F02M 35/10* (2006.01)
(52) U.S. Cl. ................................................. 123/184.55
(58) Field of Classification Search ............ 123/184.55, 123/184.21, 184.31, 184.34, 472, 475, 238, 123/232, 248, 249, 233, 234, 235, 236, 237, 123/204, 52.1; 55/385.3; 418/206.1, 103, 418/13, 146, 143–145, 151, 94; *F02M 35/10*
See application file for complete search history.

(56) References Cited

U.S. PATENT DOCUMENTS

| 4,543,918 | A | 10/1985 | Ma |
| 4,759,320 | A | 7/1988 | Fujii et al. |
| 4,890,586 | A | 1/1990 | Fujii et al. |
| 5,740,770 | A | 4/1998 | Morota |
| 6,408,810 | B1 | 6/2002 | Leipelt et al. |
| 7,299,688 | B2 * | 11/2007 | Salvisberg ................. 73/117.3 |
| 7,331,332 | B2 * | 2/2008 | Baumann et al. ............ 123/481 |
| 2004/0216721 | A1 * | 11/2004 | Nagashii et al. ............. 123/470 |
| 2006/0288673 | A1 * | 12/2006 | Wimmer .................... 55/385.3 |
| 2007/0175430 | A1 * | 8/2007 | Yokoi .................... 123/184.55 |
| 2007/0175431 | A1 * | 8/2007 | Yokoi .................... 123/184.55 |

FOREIGN PATENT DOCUMENTS

| JP | 02-223632 | 9/1990 |
| JP | 09-100720 | 4/1997 |

* cited by examiner

*Primary Examiner*—Stephen K Cronin
*Assistant Examiner*—Keith Coleman
(74) *Attorney, Agent, or Firm*—Keating & Bennett, LLP

(57) ABSTRACT

A vehicle, such as a motorcycle, includes an engine having at least one intake port. An air intake assembly introduces air into the intake port. In one arrangement, the air intake assembly includes a stationary funnel and a movable funnel positioned on the inlet side of the fixed funnel and selectively cooperates with the stationary funnel to deliver air to the intake port of the engine. A seal member creates at least a substantial seal between the fixed funnel and the movable funnel when the funnels are in cooperation with one another. A retention mechanism inhibits the seal member from disengaging with the funnel onto which the seal member is positioned. In one arrangement, the movable funnel is formed with one or more projections and the seal member is formed with one or more recesses that accommodate the projections. The projection may be a flange or a boss, among other possibilities, and the recess is configured to accommodate the specific projection.

19 Claims, 27 Drawing Sheets

[FIG. 1]
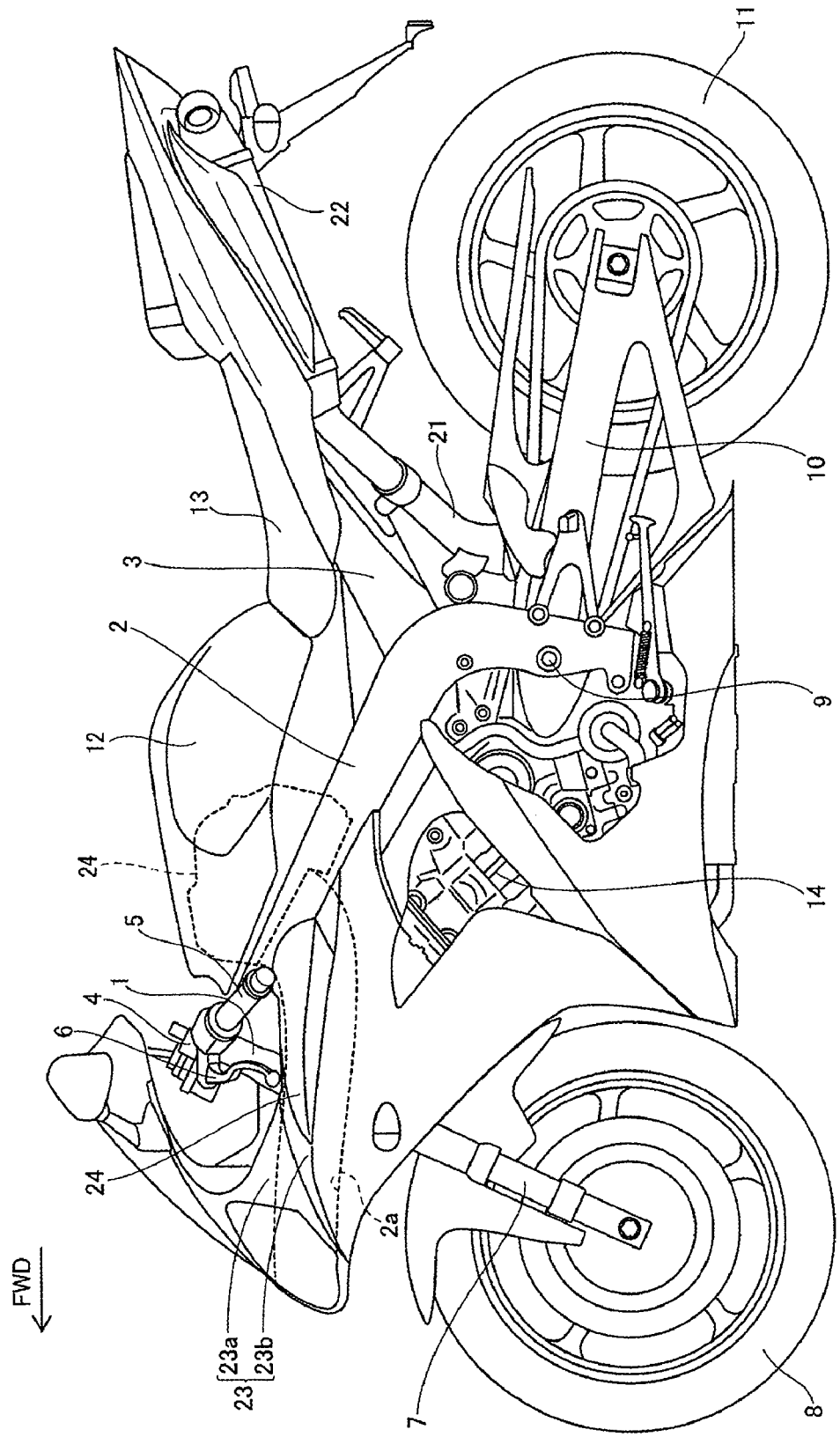

[FIG. 2]
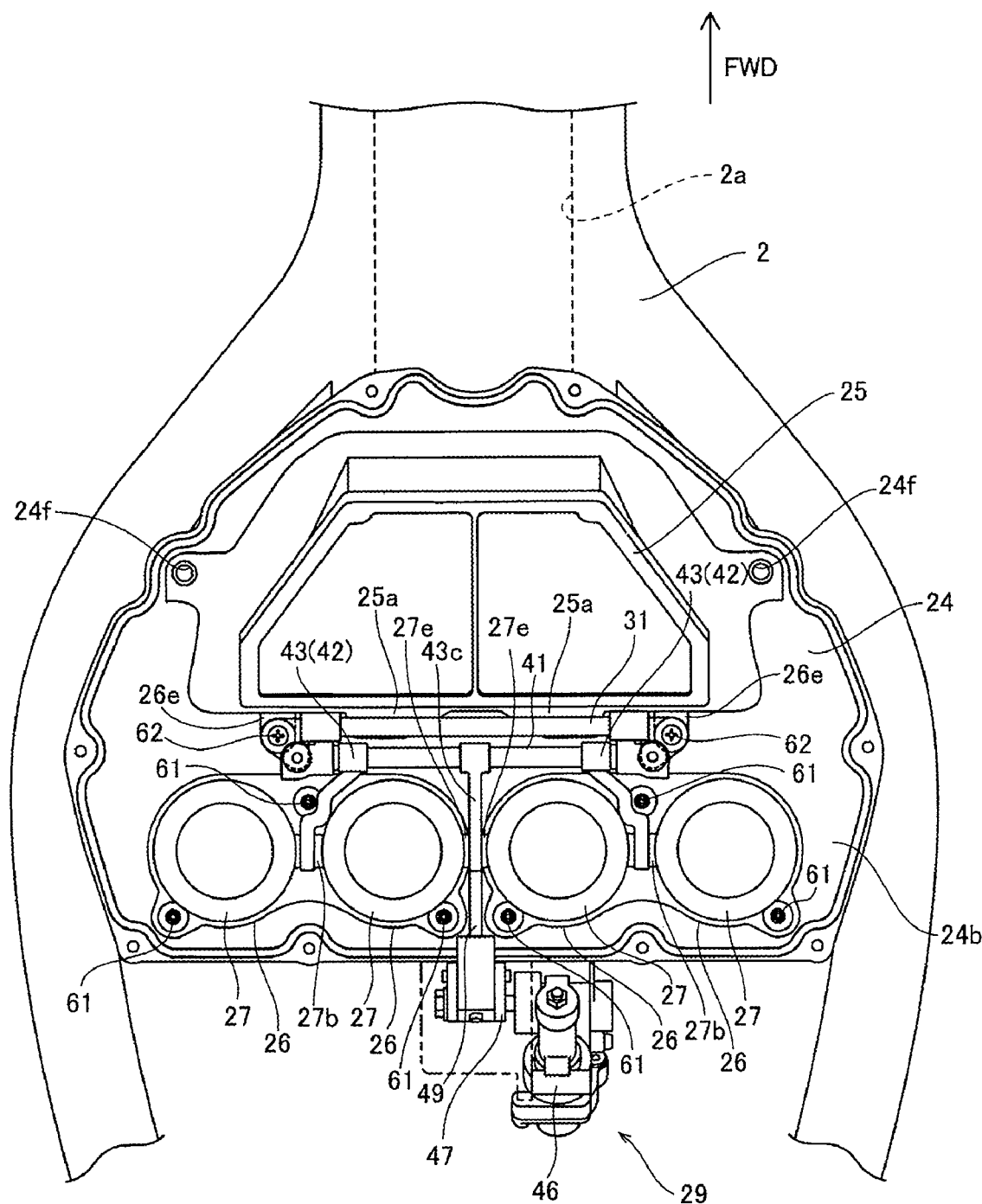

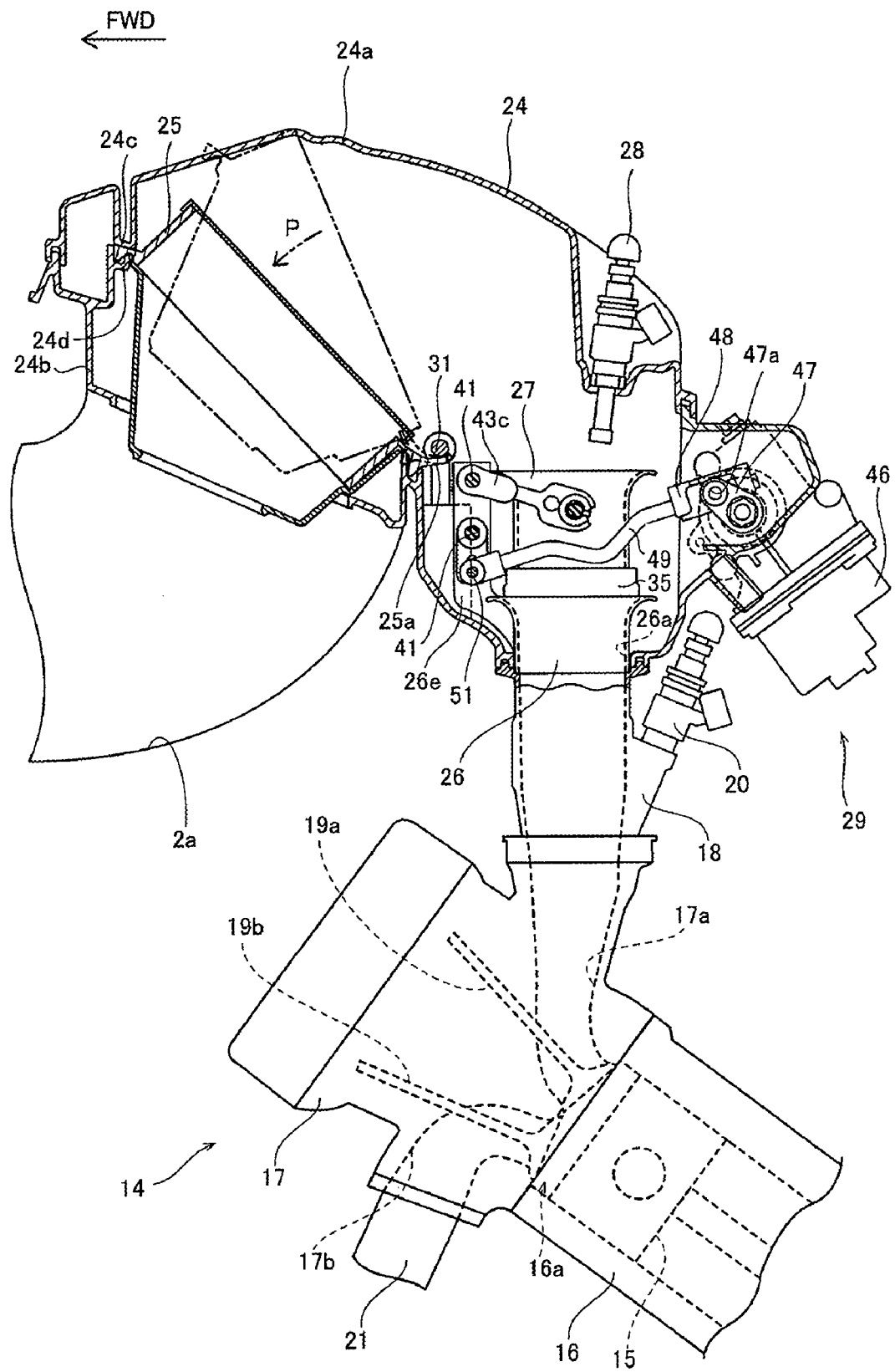
[FIG. 3]

[FIG. 4]
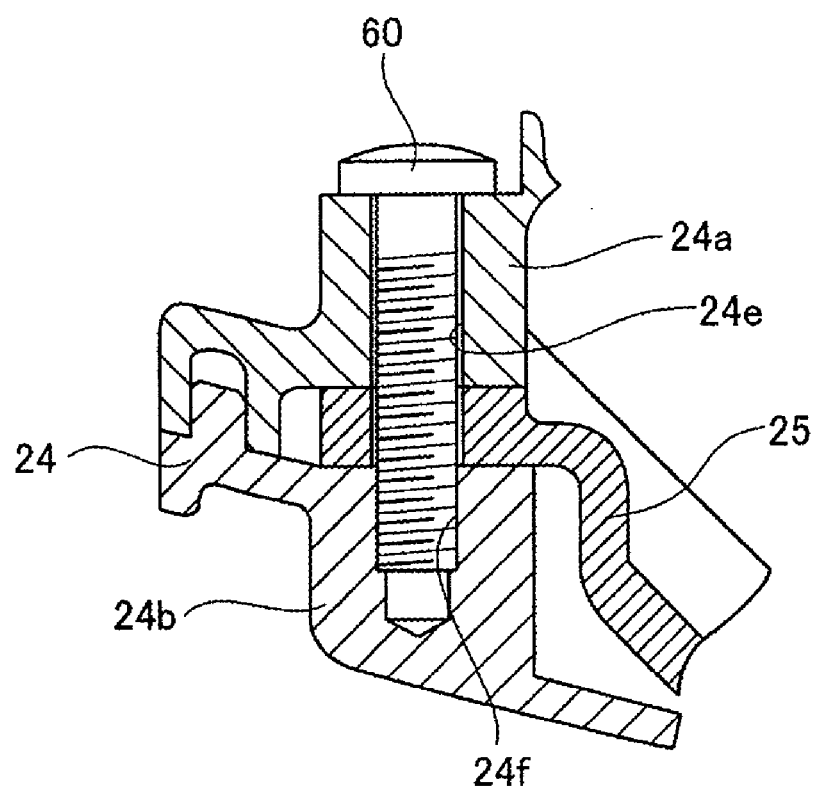

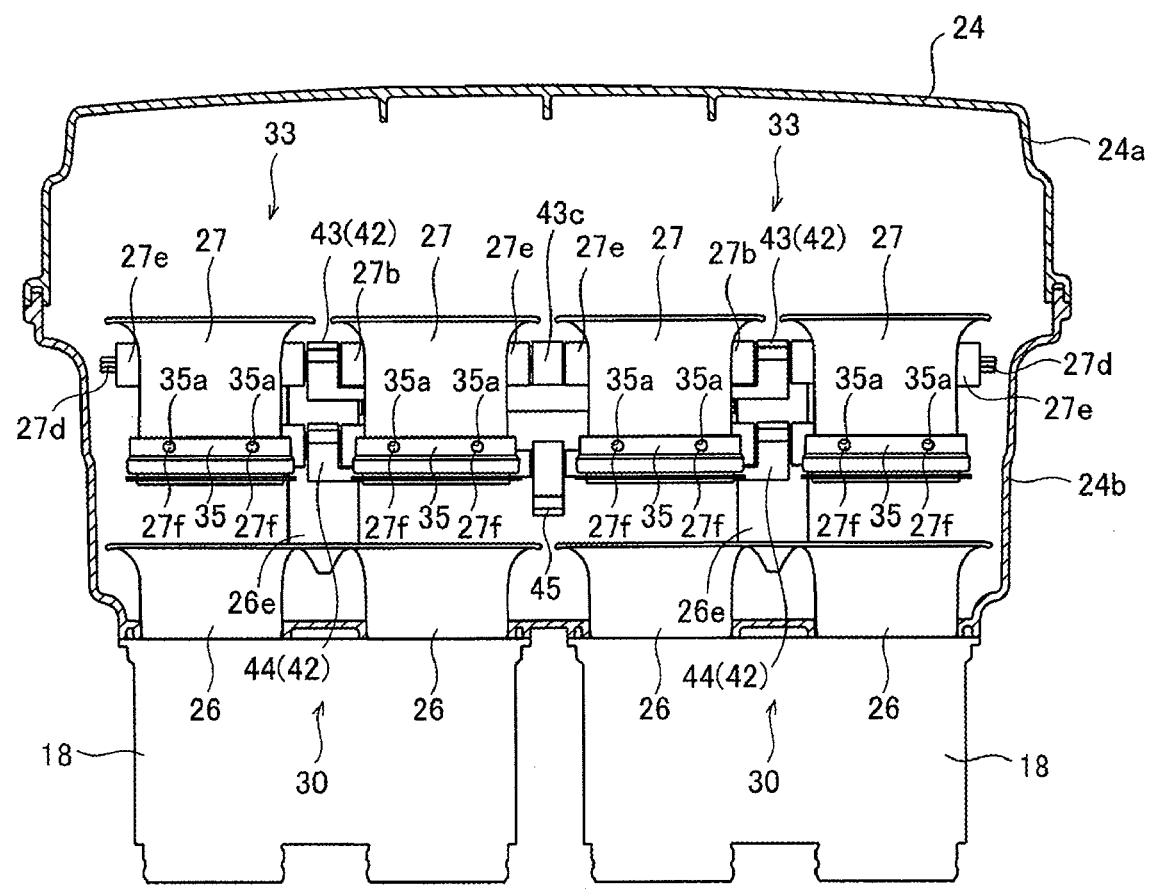
[FIG. 5]

[FIG. 6]
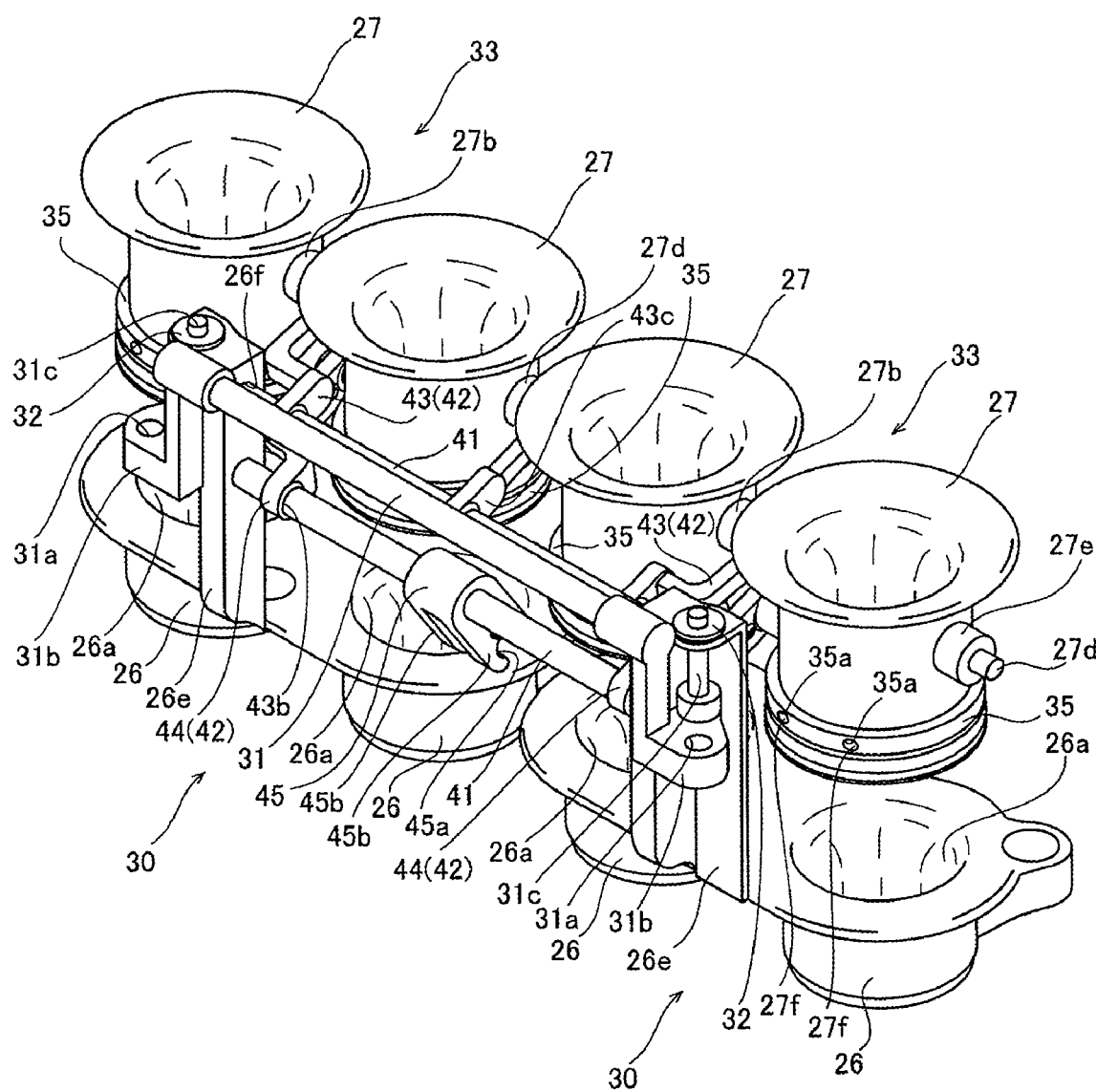

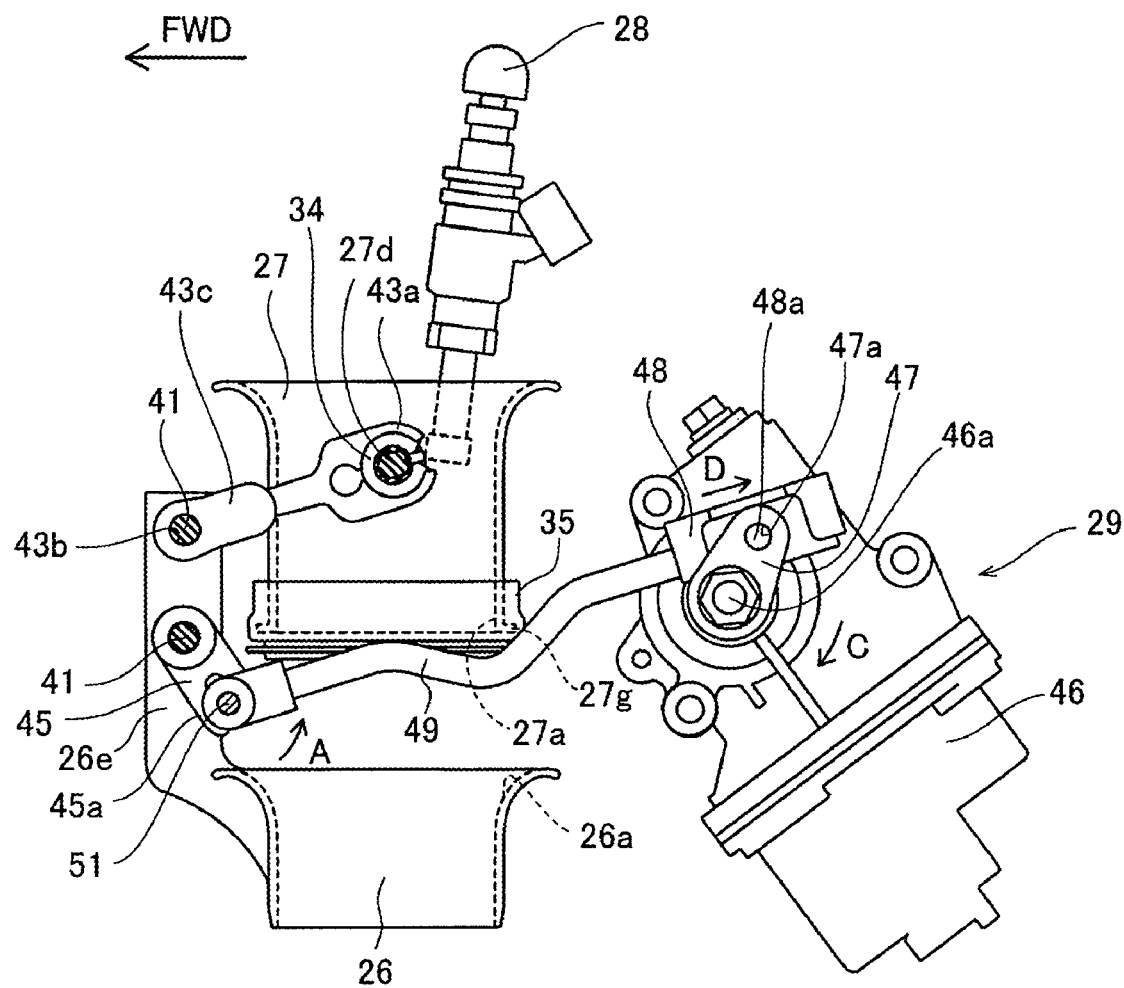
[FIG. 7]

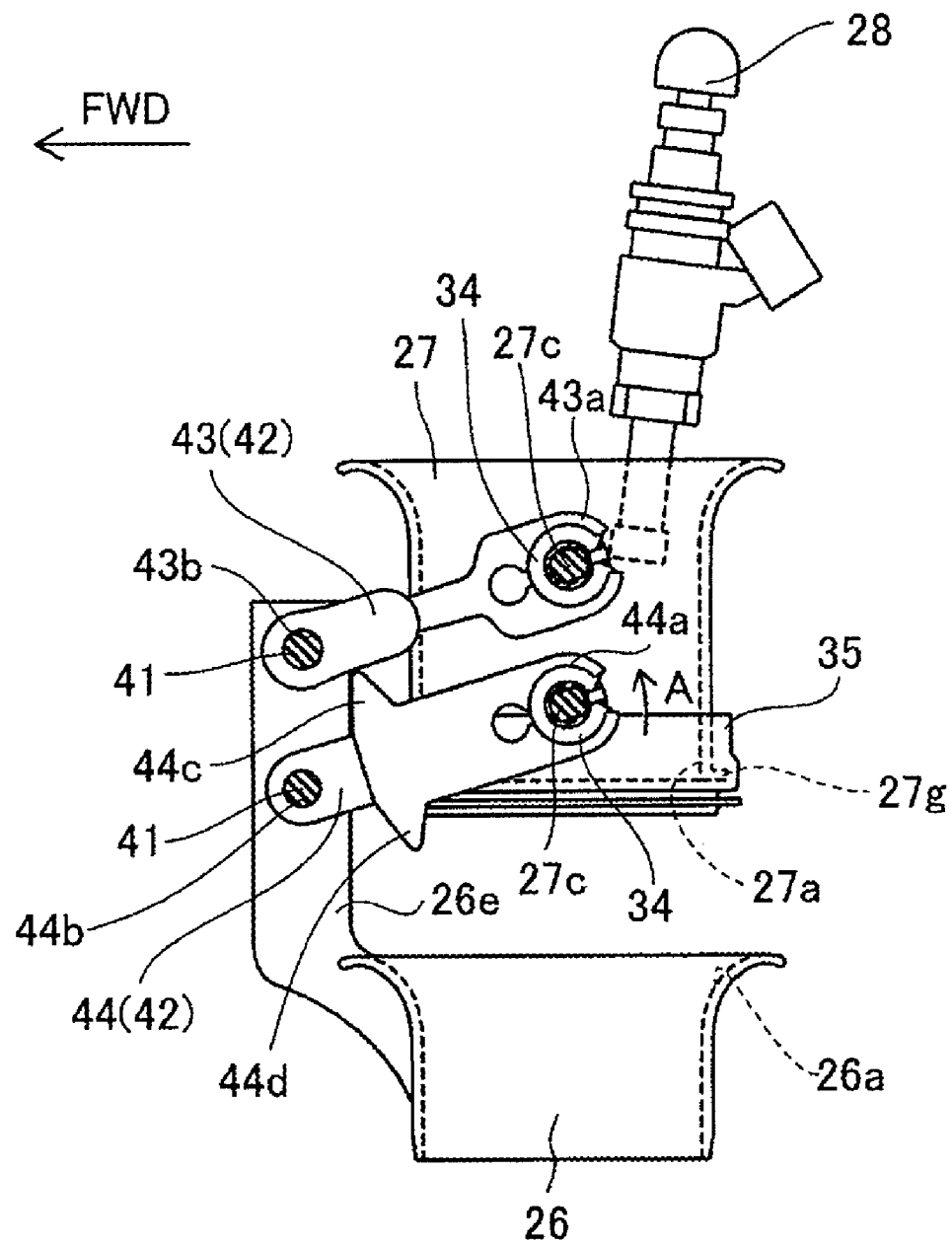
[FIG. 8]

[FIG. 9]
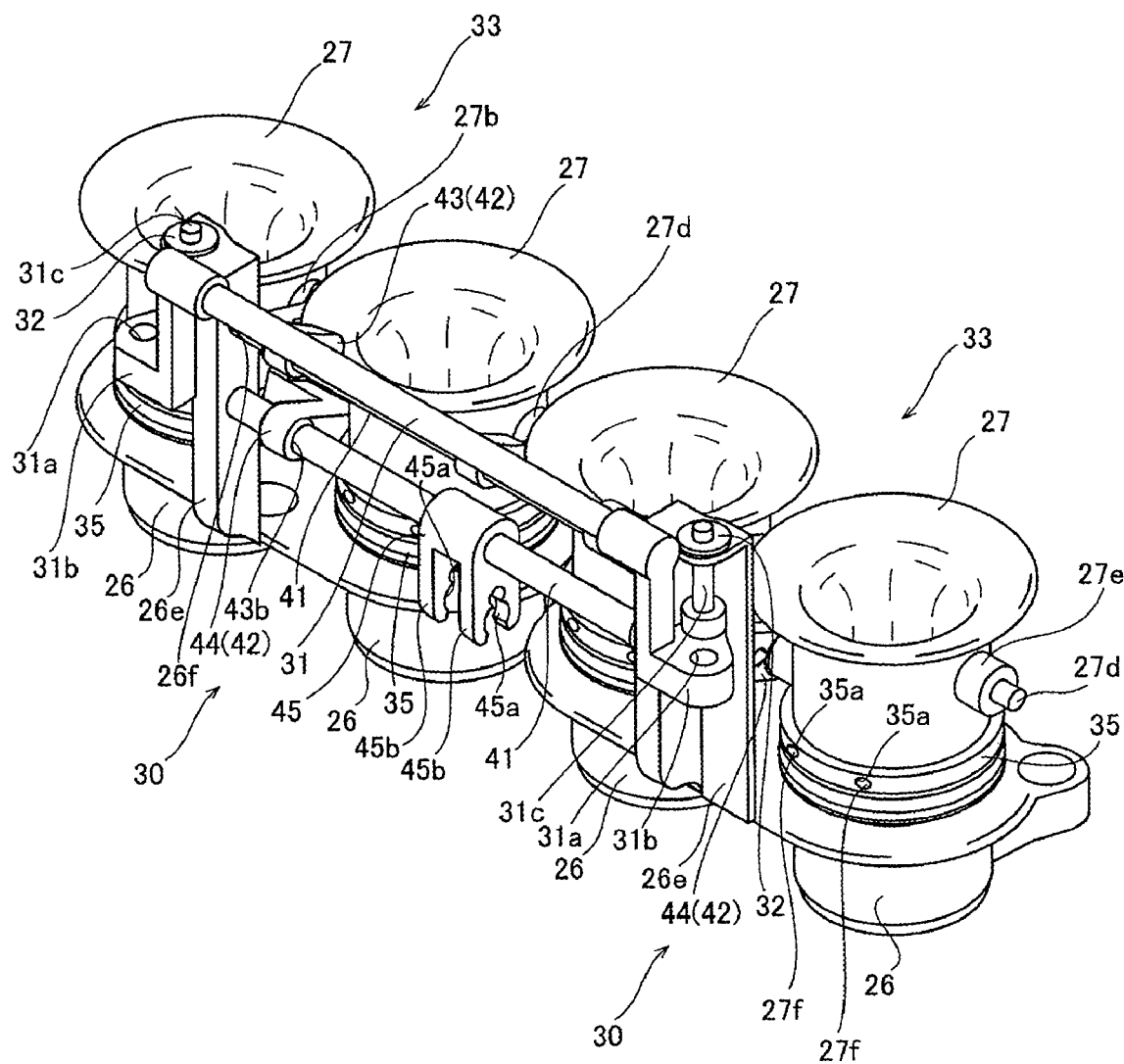

[FIG. 10]
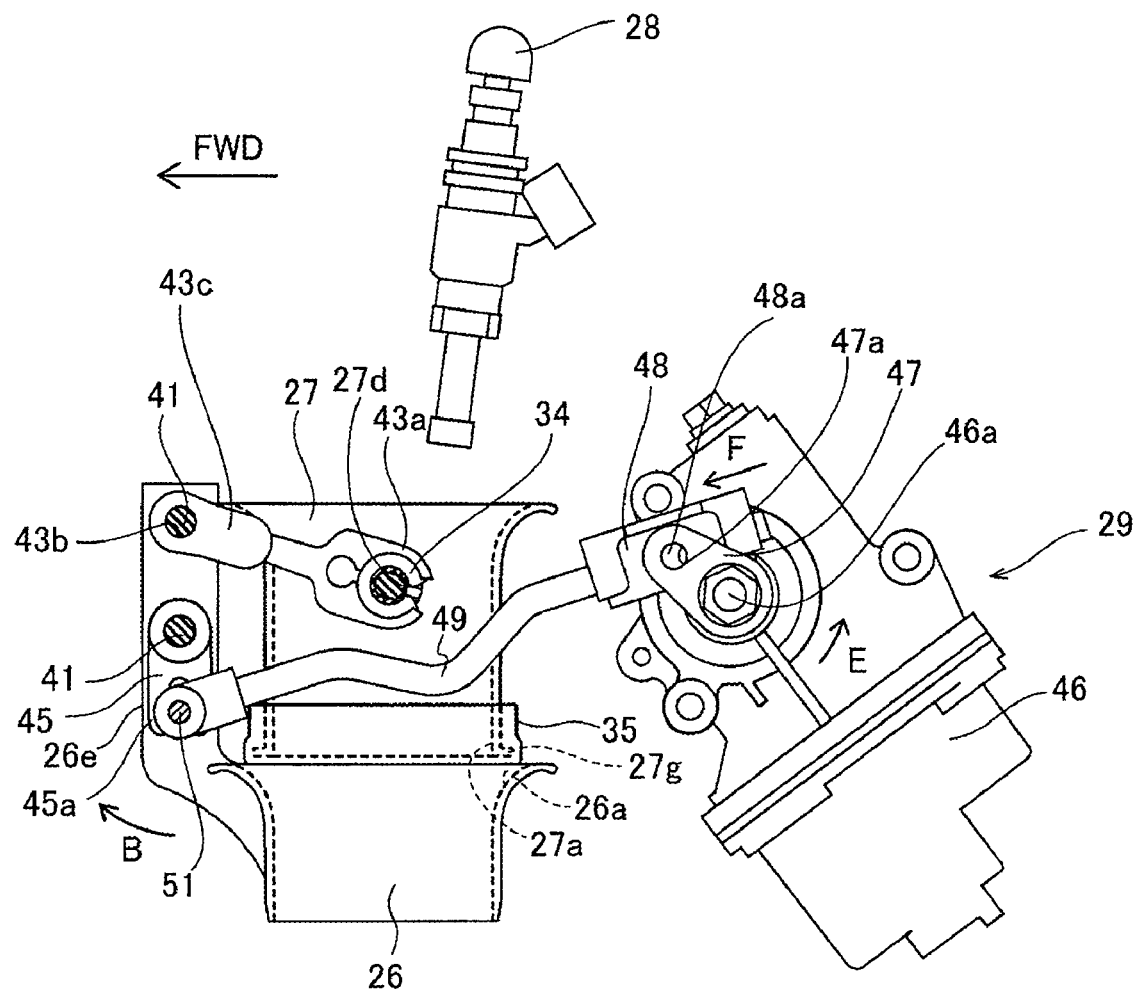

[FIG. 11]
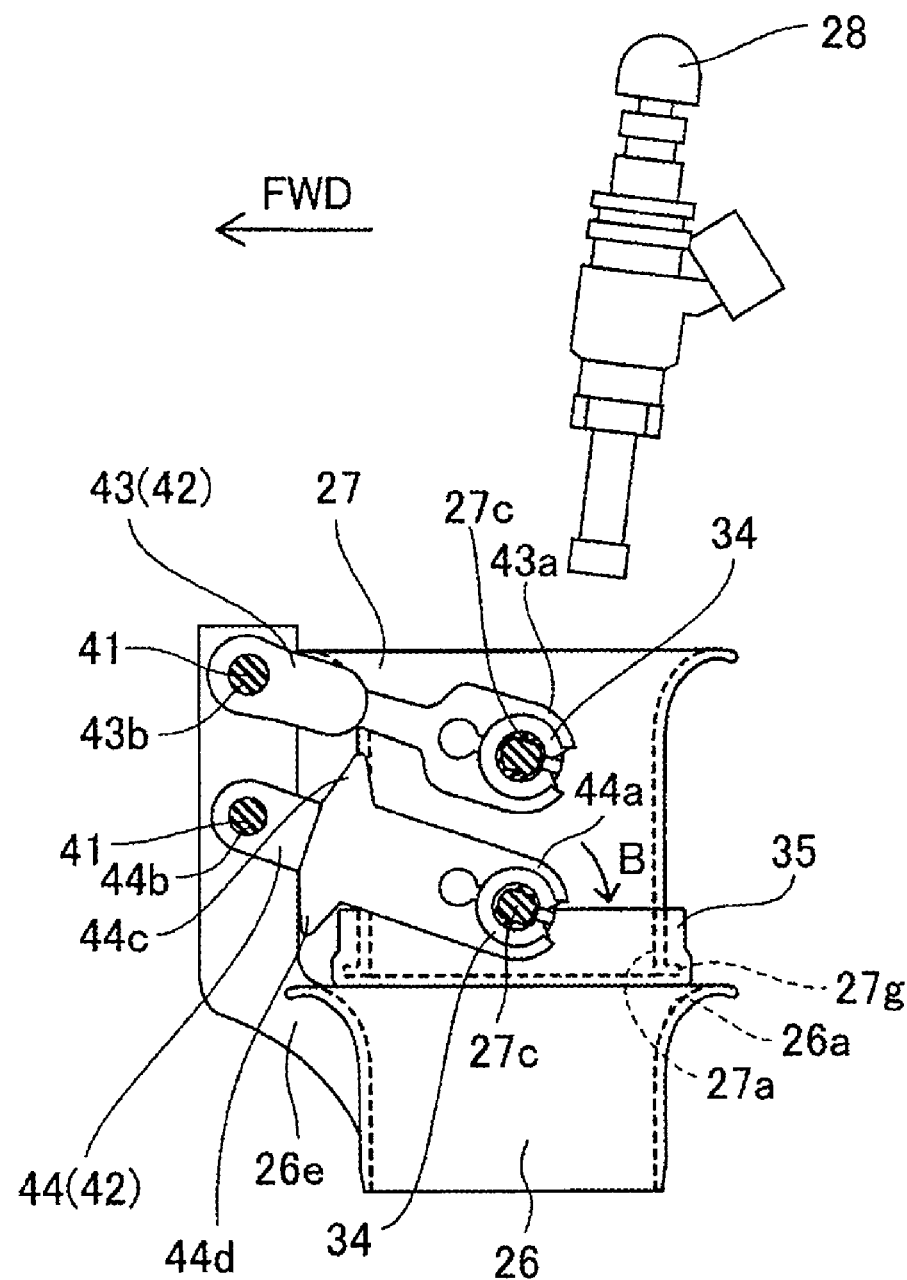

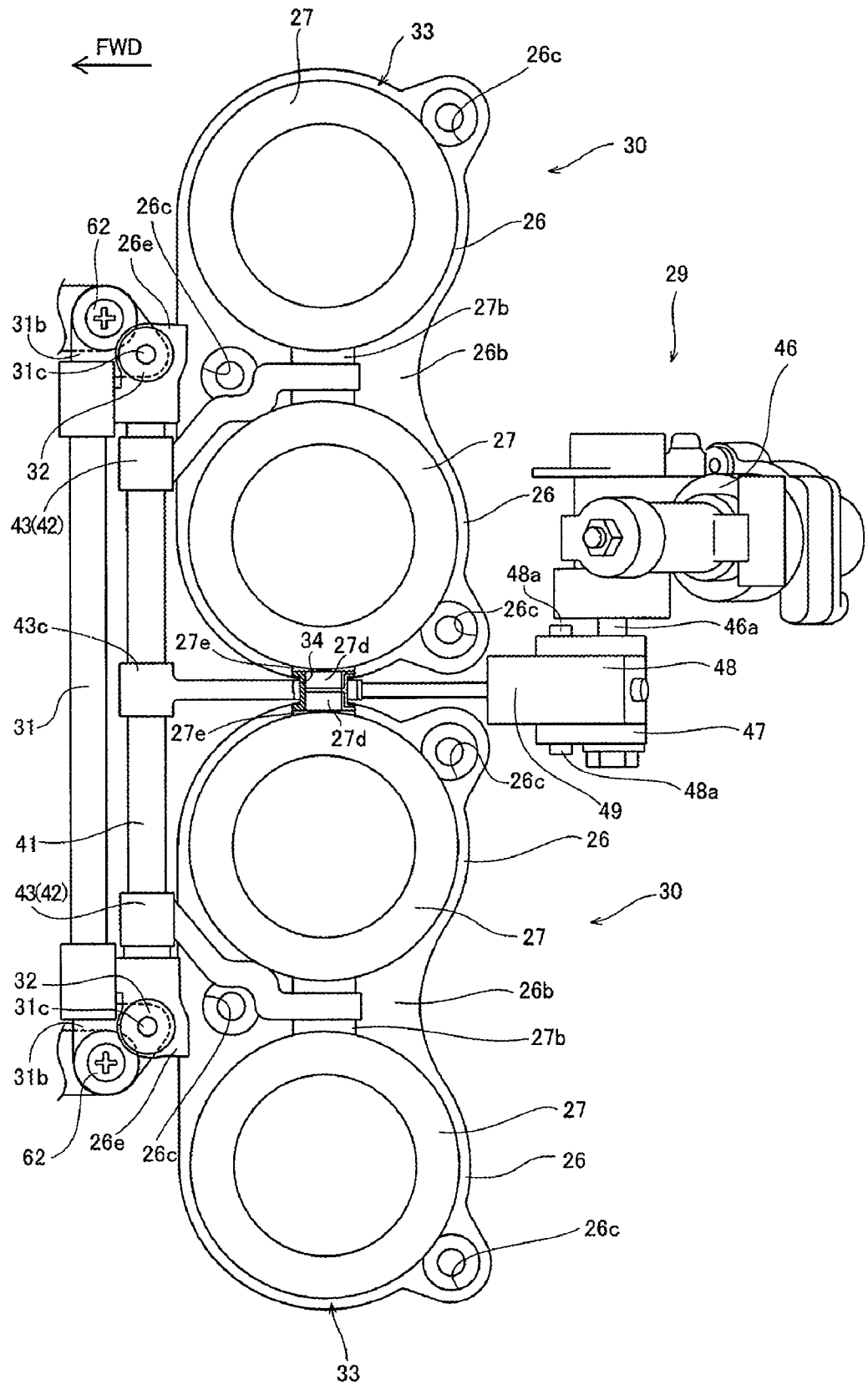
[FIG. 12]

[FIG. 13]
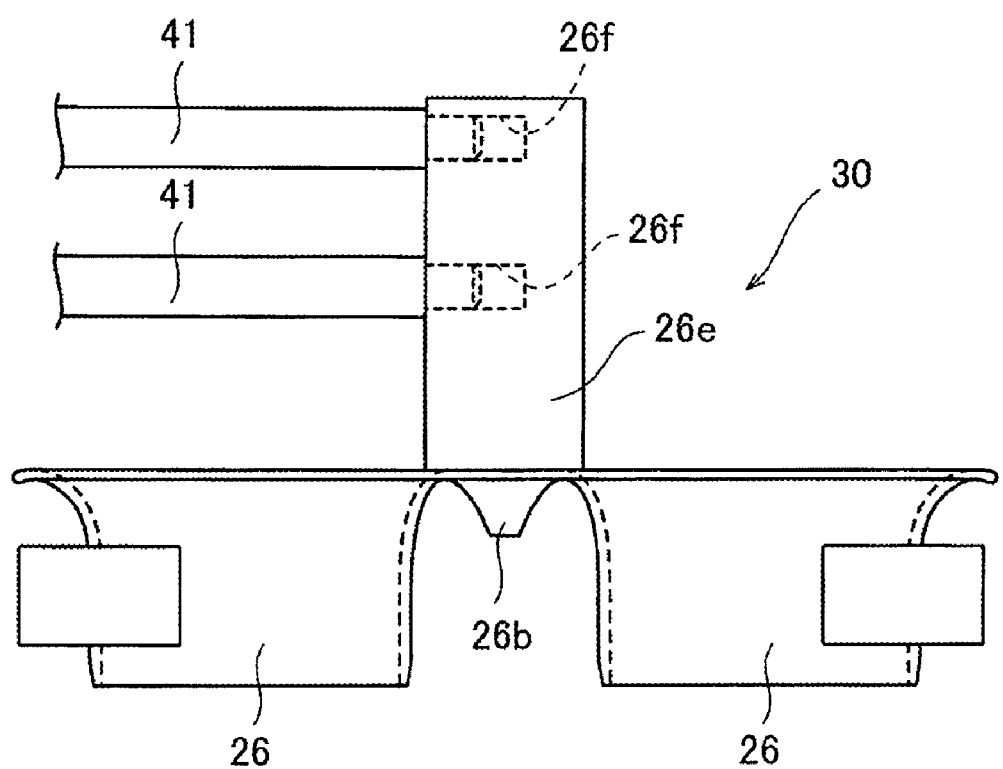

[FIG. 14]
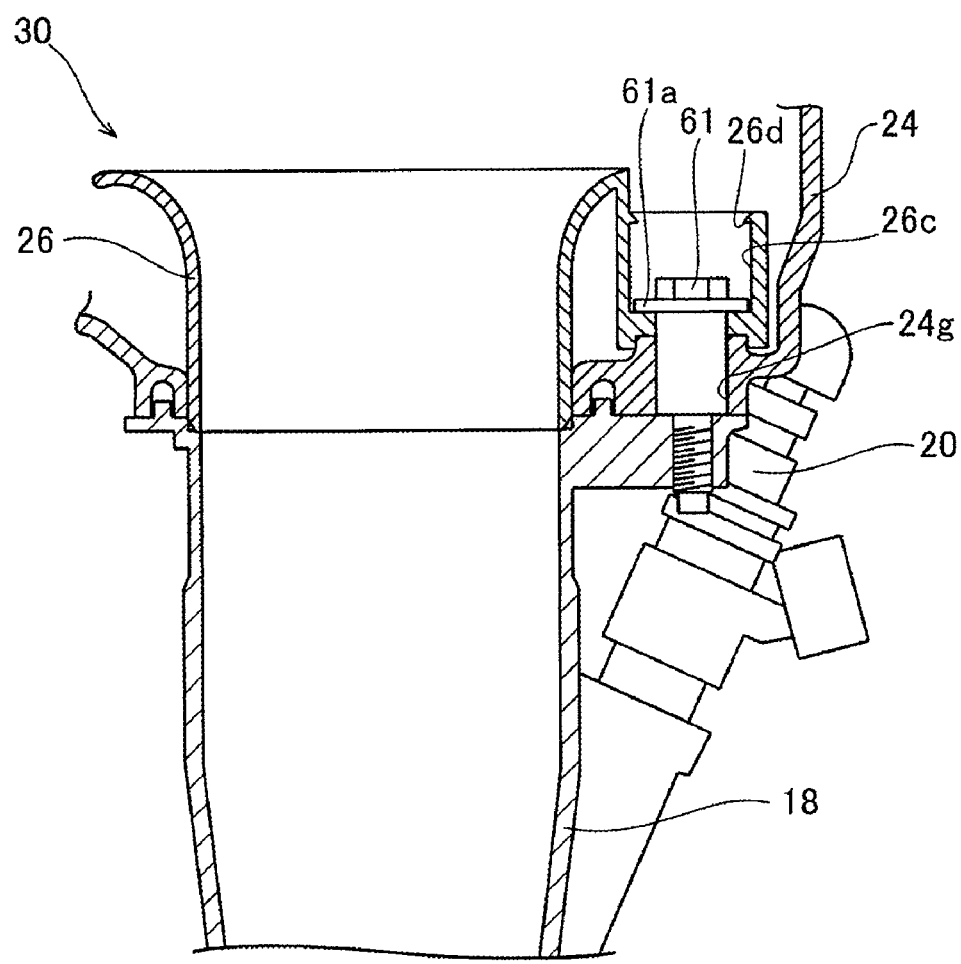

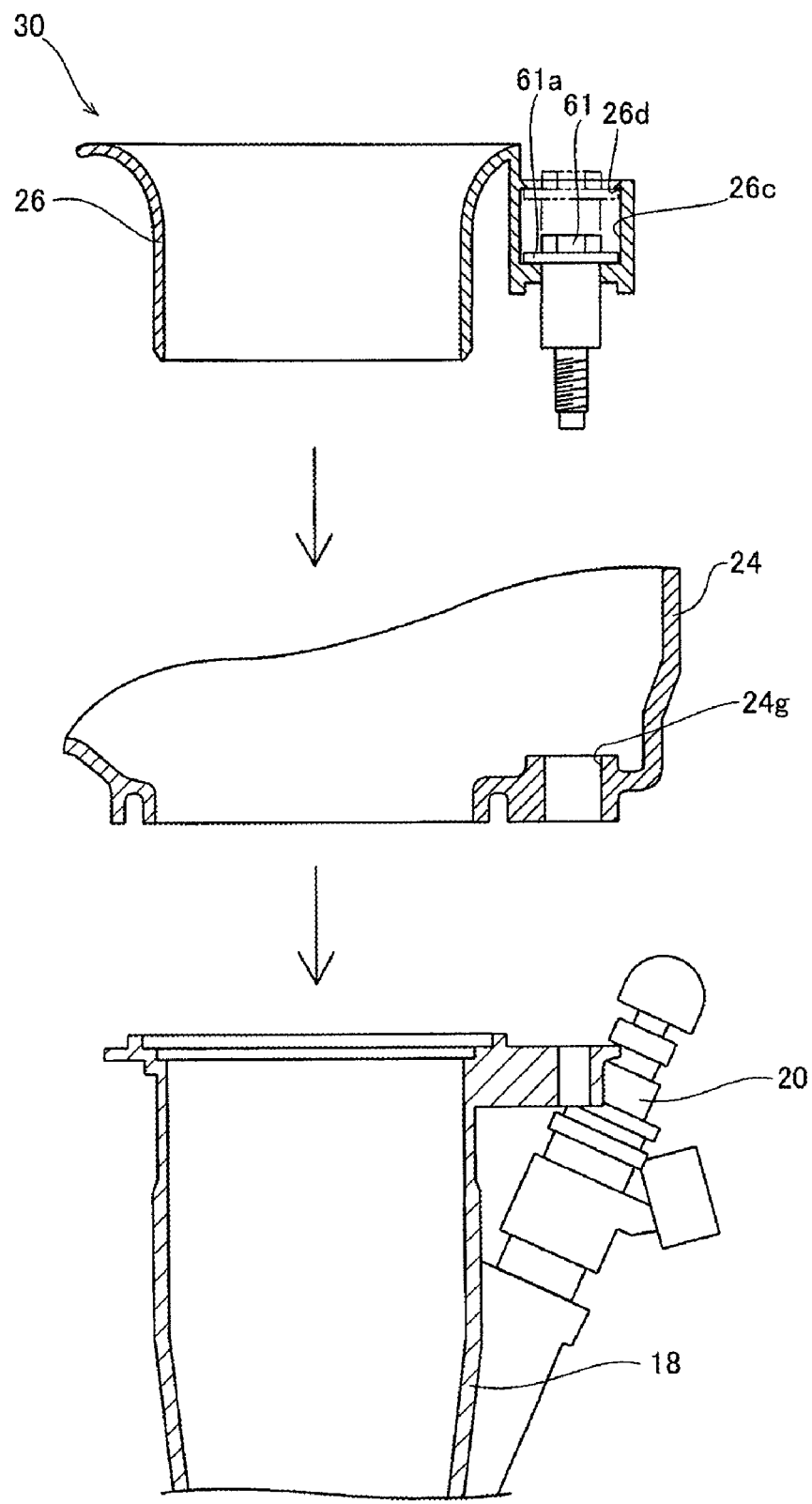
[FIG. 15]

[FIG. 16]
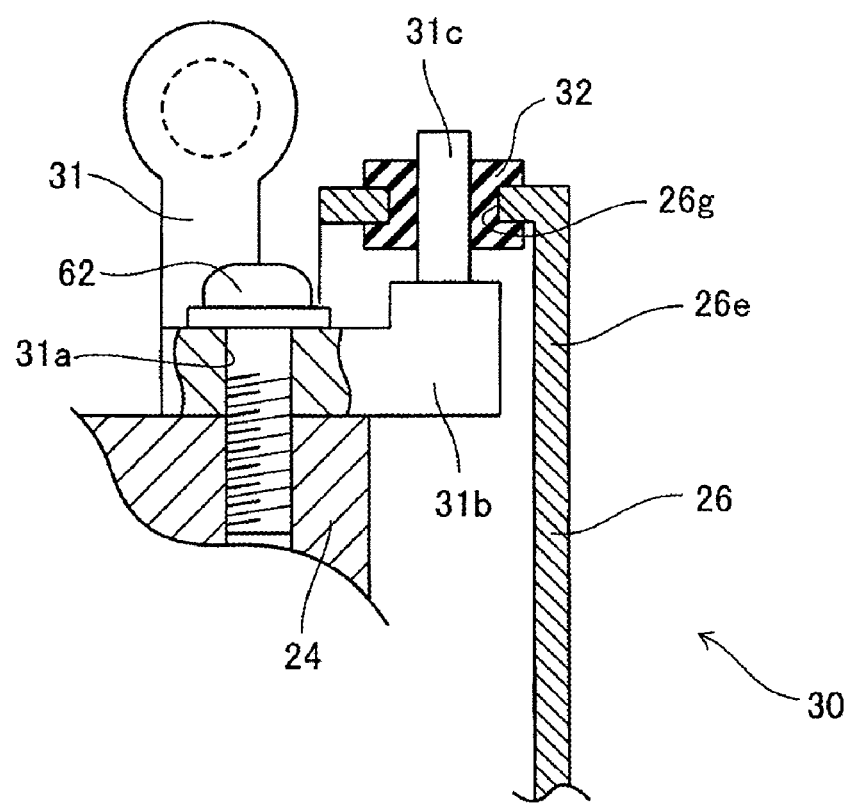

[FIG. 17]
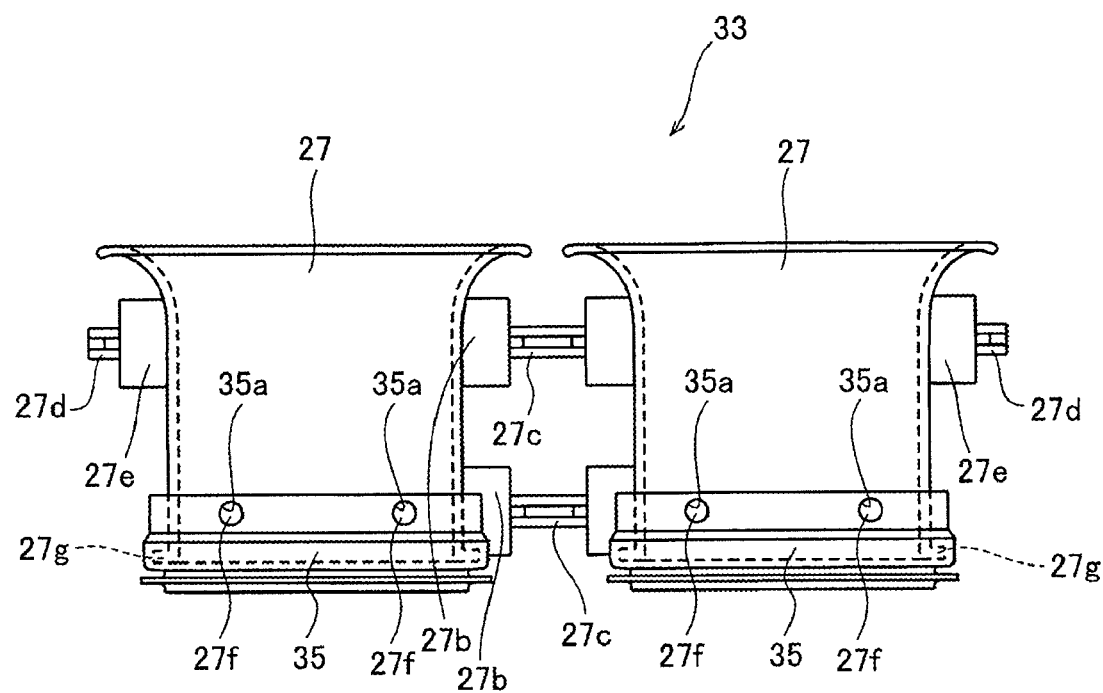

[FIG. 18]
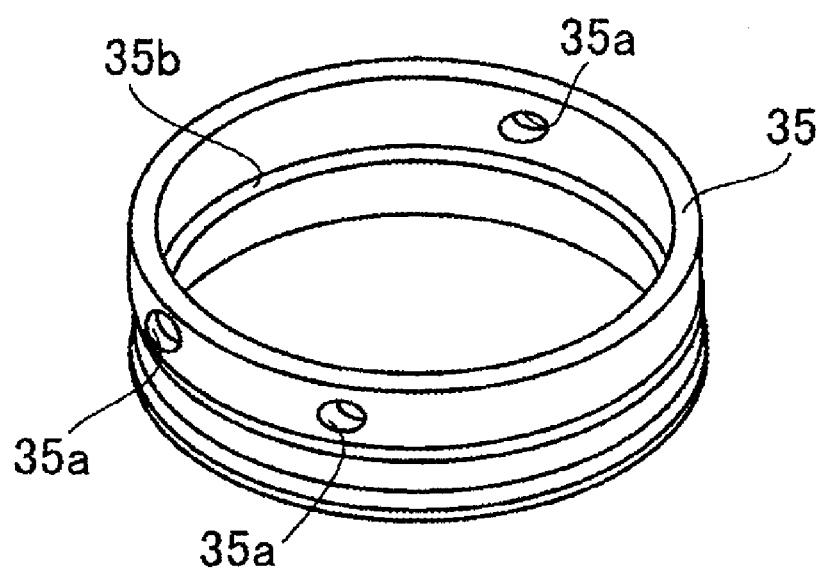

[FIG. 19]
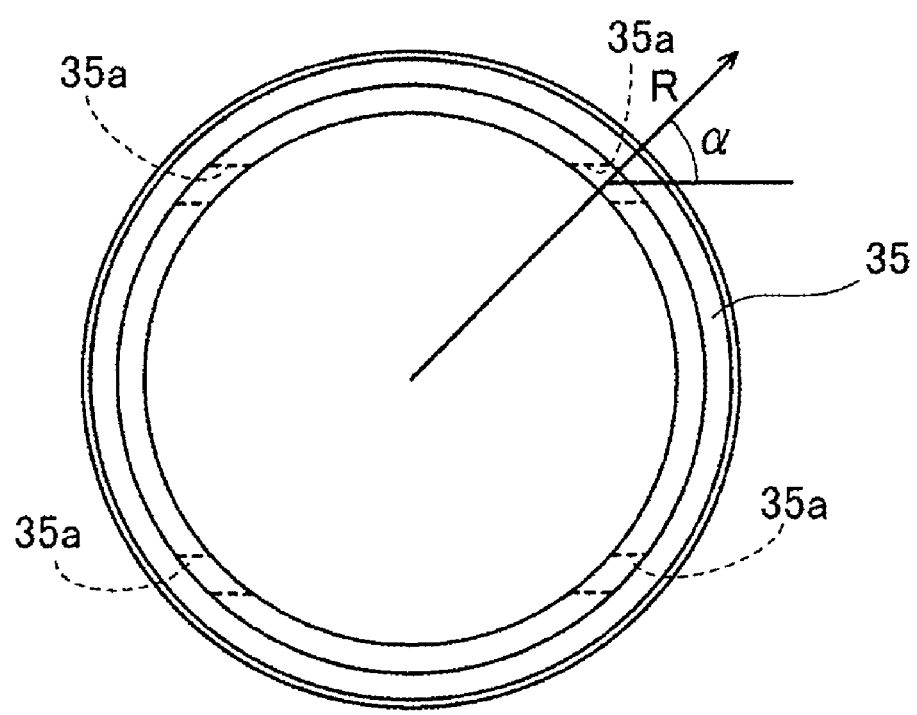

[FIG. 20]
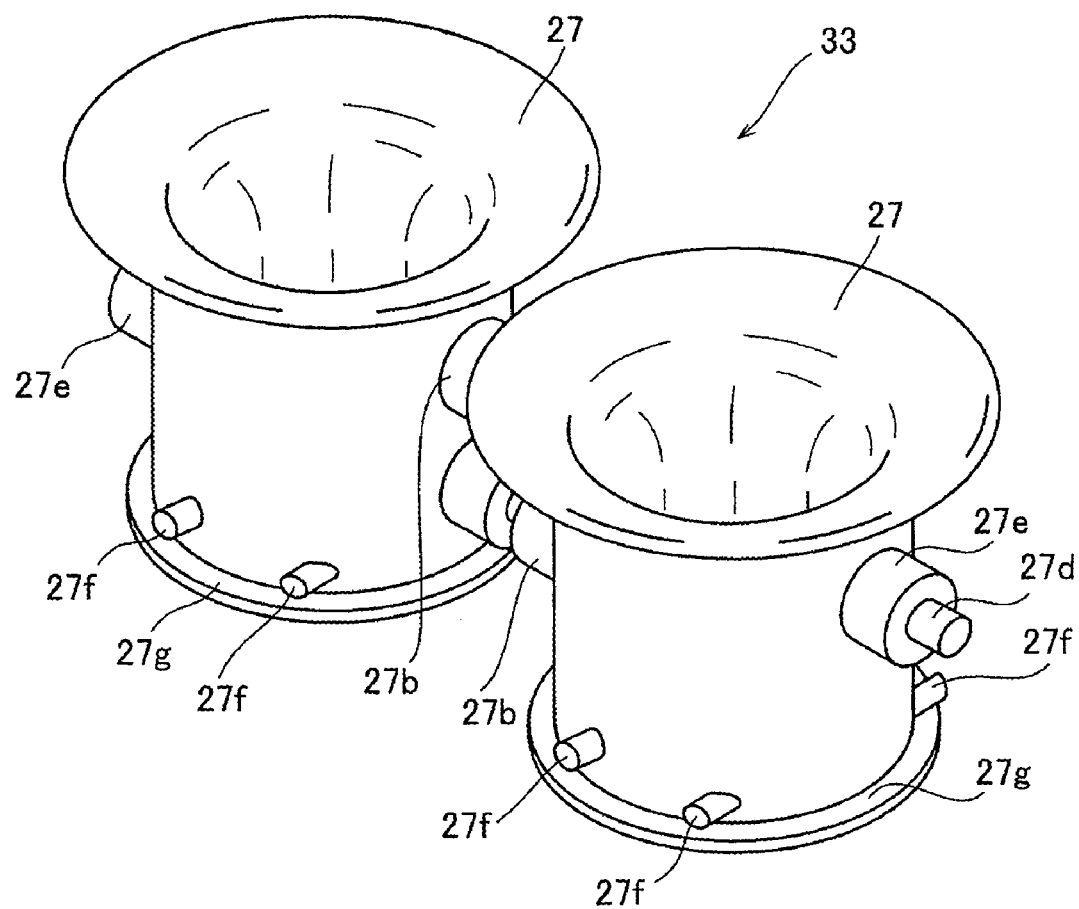

[FIG. 21]
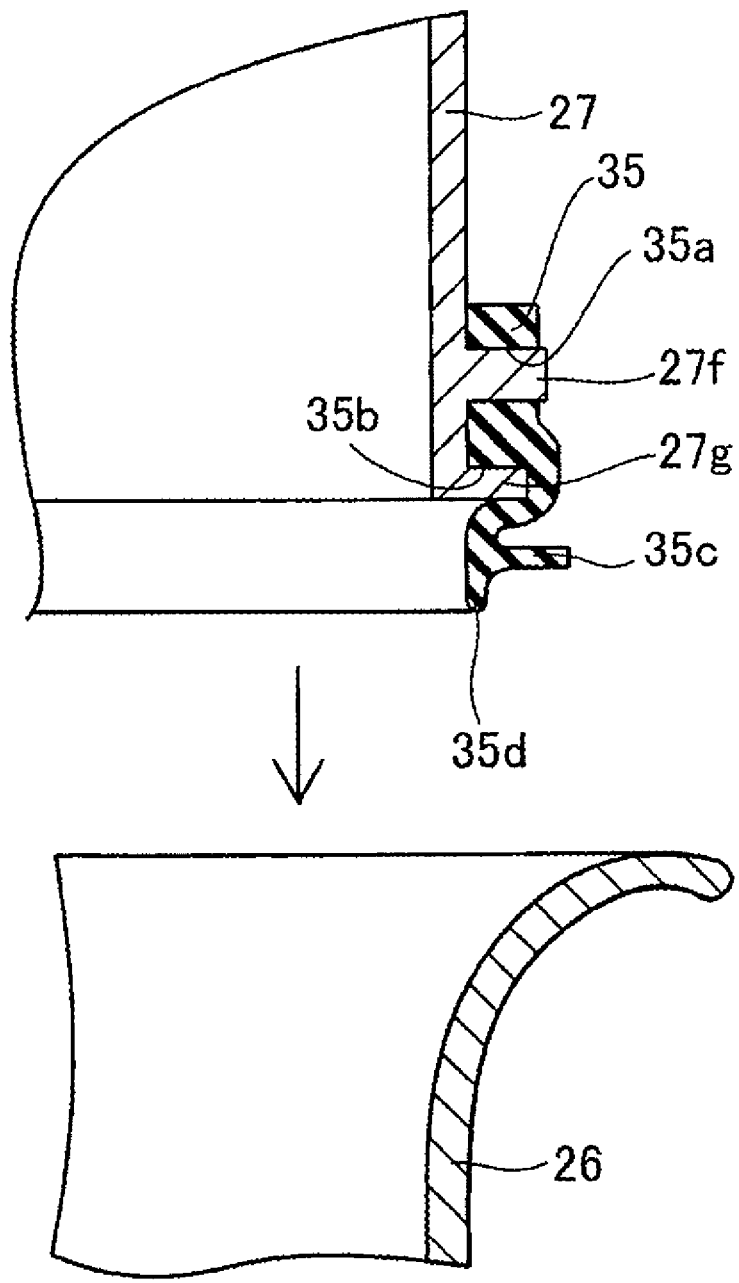

[FIG. 22]
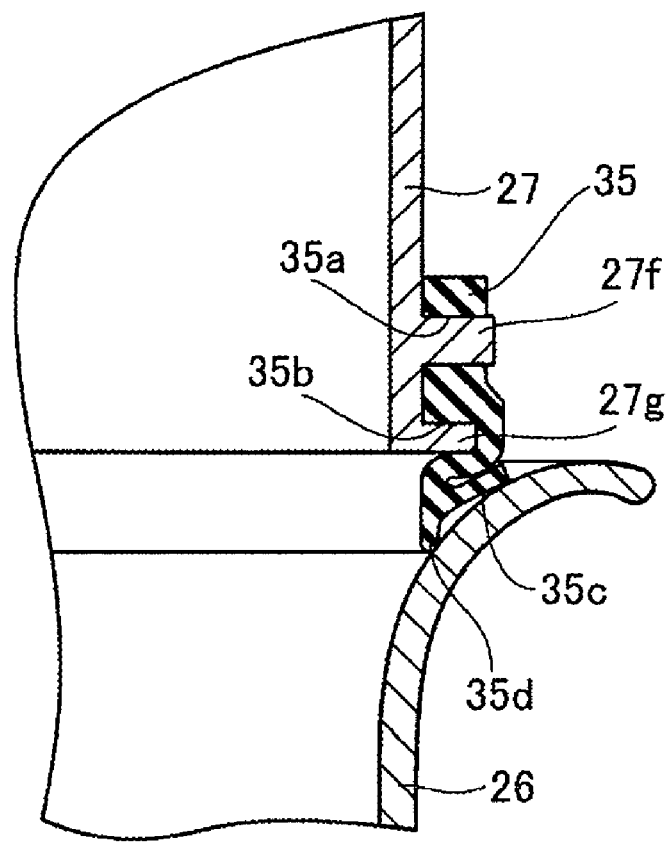

[FIG. 23]
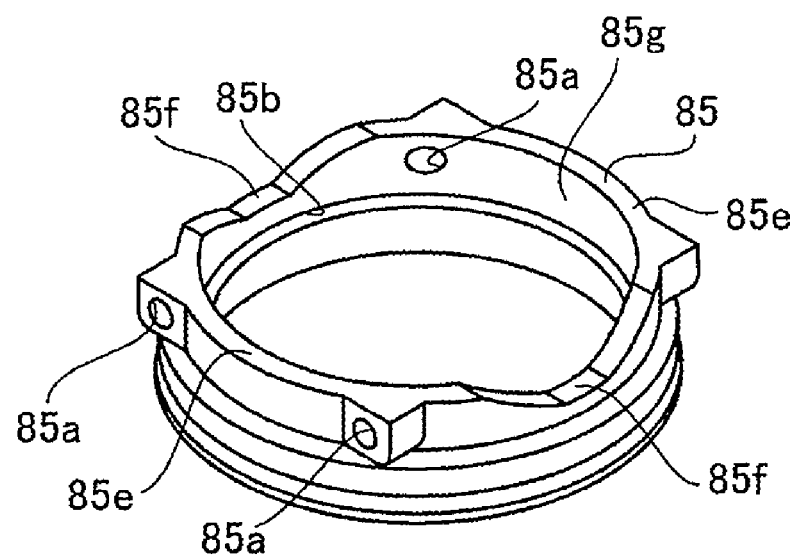

[FIG. 24]
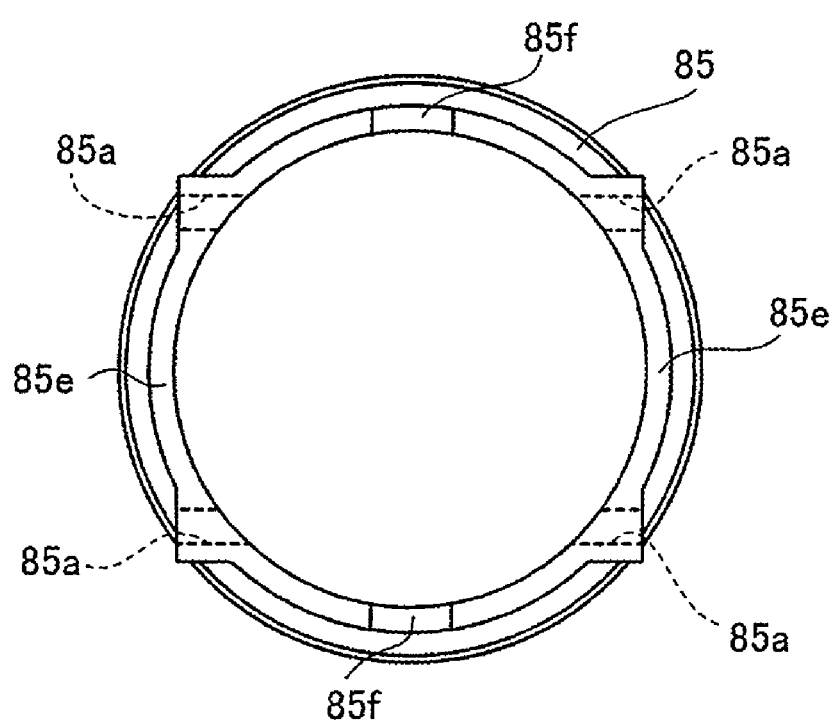

[FIG. 25]
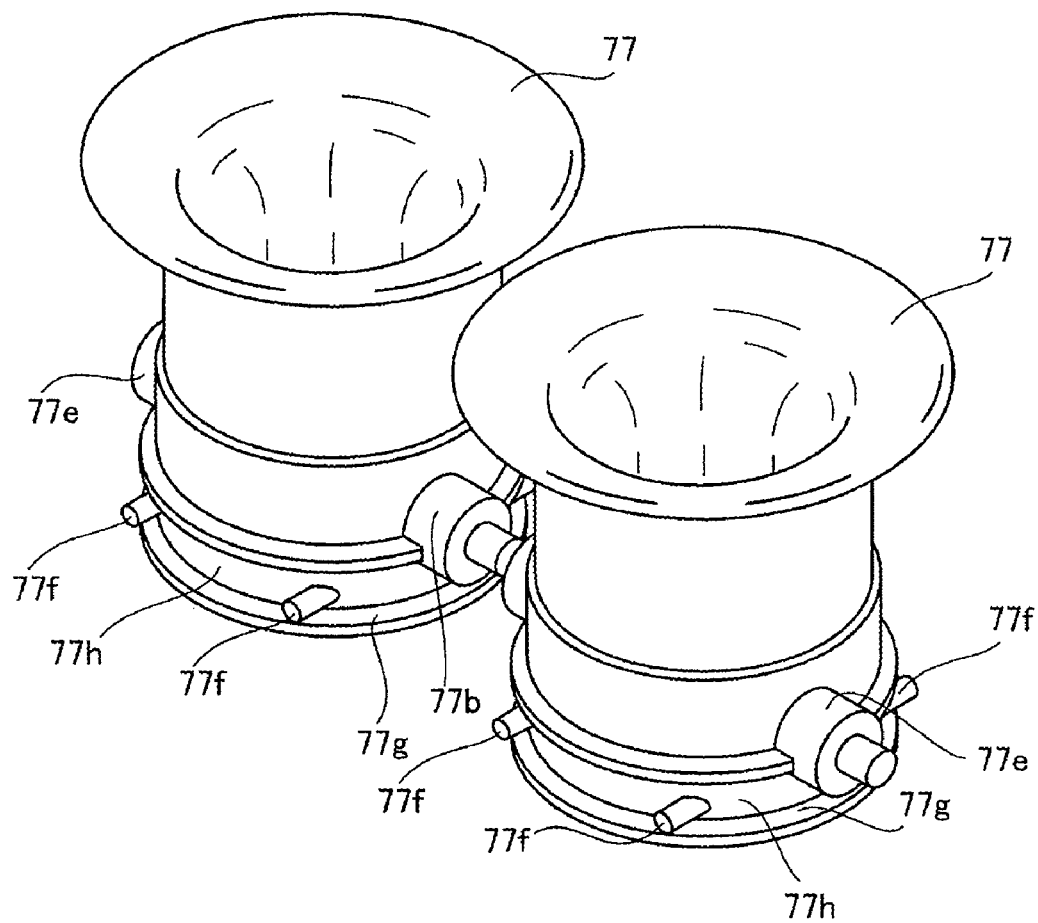

[FIG. 26]
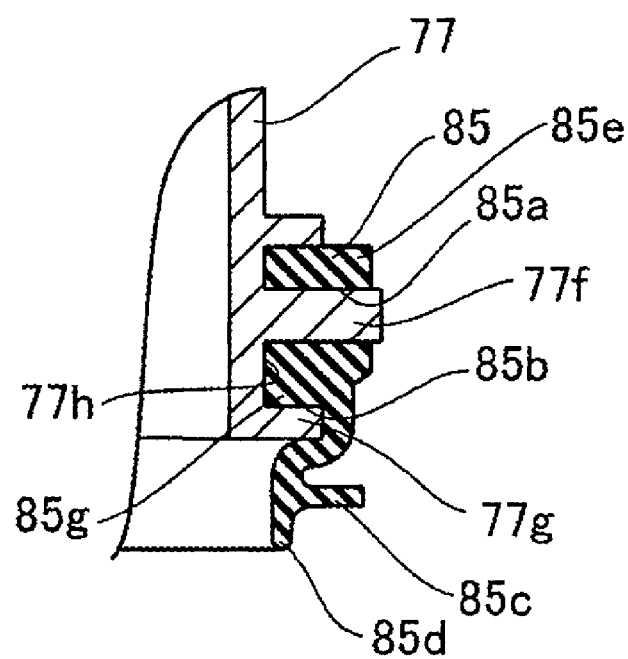

[FIG. 27]
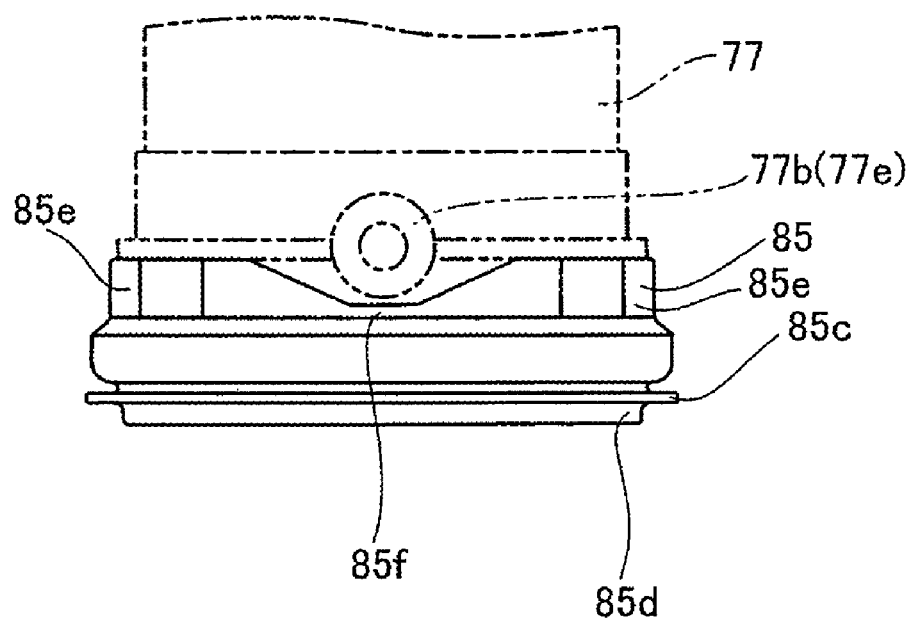

VEHICLE WITH VARIABLE AIR INTAKE ARRANGEMENT

RELATED APPLICATIONS

This application is related to, and claims priority from, Japanese Patent Application Nos. 2006-253673, filed Sep. 20, 2006, and 2006-111560, filed Apr. 14, 2006, each entitled "VEHICLE." The entireties of these applications are hereby incorporated by reference herein and made a part of the present specification.

BACKGROUND OF THE INVENTION

1. Field of the Invention

The present invention relates to a vehicle, and more particularly to a vehicle having a variable length air intake arrangement for introducing air to an intake port of an engine.

2. Description of the Related Art

Some vehicles incorporate a variable length air intake system. For example, a variable length air intake system shown in Japanese Patent Publication No. 63-182229 includes a stationary intake pipe for introducing air to an intake port of an engine, a movable pipe movably disposed on the air inlet side of the stationary pipe. A rotary arm is positioned on one side of the movable pipe and is attached to the movable pipe. A rotary shaft is positioned on the same side of the movable pipe and is coupled to the rotary arm. A motor is also positioned on the same side of the movable pipe as the rotary arm and shaft, and is configured to drive the rotary arm. In this intake system, the rotary arm is moved rotationally about the rotary shaft by the driving force of the motor, so that the movable pipe attached to the rotary arm can move relative to the stationary pipe to vary a length of the intake system.

SUMMARY OF THE INVENTION

An aspect of the present invention involves the realization that, because the structure disclosed in Japanese Patent Publication No. 63-182229 is not provided with a seal arrangement to seal the gap between the movable intake pipe and the stationary intake pipe, it is difficult to restrict air leakage through the gap between the movable intake pipe and the stationary intake pipe. Accordingly, it is difficult to supply a desired amount of air to the intake port.

One aspect of one or more preferred embodiments of the present invention is to provide a vehicle in which air leakage through the gap between a movable intake pipe, or funnel, and a stationary intake pipe, or funnel, can be restricted. More generally, an aspect of one or more preferred embodiments is to provide a seal arrangement for an air intake arrangement having a stationary portion and a movable portion.

An aspect of a preferred embodiment involves a vehicle including an engine having at least one intake port. At least one stationary funnel introduces air to the intake port of the engine. A movable funnel selectively cooperates with the stationary funnel to introduce air to the intake port of the engine. A seal member creates at least a substantial seal between the stationary funnel and the movable funnel when the stationary funnel and the movable funnel cooperate with one another. A retention mechanism retains the seal member to one of the stationary funnel and the movable funnel to inhibit disengagement of the seal member from the stationary funnel or the movable funnel.

With the vehicle as described in the above paragraph, in which a seal member is disposed between the stationary funnel and the movable funnel, air leakage through the gap between the movable funnel and the stationary funnel can be inhibited or eliminated when the movable funnel is in cooperation with the stationary funnel. With such a construction, a desired amount of air can be supplied to the intake port. In addition, the retention mechanism for retaining the seal member with either one of the stationary funnel and the movable funnel is also provided. Thus, the seal member can be prevented from disengaging from the stationary funnel or the movable funnel. With such a construction, it is possible to inhibit or prevent the seal member from falling off from the stationary funnel or the movable funnel and possibly entering the inside of the engine, thereby preventing damage to the engine.

Yet another aspect of a preferred embodiment involves the vehicle described above, wherein the retention mechanism includes a first engagement defined by one of the stationary funnel and the movable funnel, and a second engagement surface defined by the seal member. The first engagement surface engages the second engagement surface to inhibit disengagement of the seal member from the one of the stationary funnel and the movable funnel. With such a construction, it is not necessary to provide a separate member for preventing the seal member from falling off from the stationary funnel or the movable funnel, and accordingly the number of parts can be reduced.

Still another aspect of a preferred embodiment involves the vehicle described above, wherein, the first engagement surface of the one of the stationary funnel and the movable funnel is defined by at least one projection. The seal member includes at least one recess that defines the second engagement surface. With such an arrangement, the first engagement surface and the second engagement surface can be easily engaged with one another, and hence the seal member can be easily prevented from falling off of the one of the stationary funnel and the movable funnel.

Another aspect of a preferred embodiment involves the vehicle described above, wherein the retention mechanism includes a first engagement surface and a second engagement surface. The first engagement surface is defined by the movable funnel. With such a construction, the first engagement surface is not formed in the stationary funnel, and hence the surface of the stationary funnel can be formed to be smooth. Thus, the passage of air to be supplied to the stationary funnel can be made smooth when the movable funnel is spaced apart from the stationary funnel (when the engine is rotating at a high speed). As a result, the air supplied to the engine can be supplied smoothly, thereby avoiding a decrease in engine output.

Yet another aspect of a preferred embodiment involves the vehicle described above, wherein the at least one projection comprises a flange extending from a side surface of the movable funnel. The at least one recess comprises an annular recess that accommodates the flange. With such an arrangement, the first engagement surface and the second engagement surface can be tightly engaged with one another by inserting the flange into the annular recess. Thus, the seal member can be more reliably prevented from falling off of the movable funnel.

Still another aspect of a preferred embodiment involves the vehicle described above, wherein the at least one projection comprises a boss extending from a side surface of the movable funnel. The at least one recess accommodates the boss. With such a construction, the first engagement surface and the second engagement surface can be tightly engaged with one another by inserting the boss into the recess. Thus, the seal member can be more reliably prevented from falling off from the movable funnel.

Another aspect of a preferred embodiment involves the vehicle described above, wherein the stationary funnel, the movable funnel and the seal member are generally cylindrical in shape. The at least one recess is formed to extend at a predetermined angle with respect to a radial direction of the seal member and the boss extends in substantially the same direction as the at least one recess. With such an arrangement, even when the seal member expands radially, the expanding direction of the seal member is at the predetermined angle with respect to the extending direction of the boss and the recess, and hence the boss can be prevented from disengaging from the recess. In addition, since the boss extends in a direction at the predetermined angle with respect to the radial direction of the seal member, enlargement of the boss in the radial direction of the seal member can be avoided while the area of engagement between the boss and the recess can be increased.

Yet another aspect of a preferred embodiment involves the vehicle described above, wherein the recess is a through hole that extends completely through a wall thickness of the seal member. With this construction, it is easy to check whether or not the second projection is inserted into the second recess by visual inspection of the outside of the assembly.

Still another aspect of a preferred embodiment involves the vehicle described above, wherein the engine has a plurality of intake ports and each of the intake ports is provided with a stationary funnel and a movable funnel. A plurality of the movable funnels are formed integral with one another and the boss extends in a direction substantially perpendicular to a direction in which the plurality of the movable funnels are aligned relative to one another. With this construction, in the case where the plurality of the movable funnels are integrally molded using a split mold, the split line of the mold extends perpendicularly to the direction in which the plurality of the movable funnels are disposed adjacently. This allows the split line of the mold to extend in the same direction as the extending direction of the boss. Thus, the boss can be easily formed to extend in the desired direction.

Another aspect of a preferred embodiment involves the vehicle described above, wherein the seal member is preferably secured to either one of the stationary funnel and the movable funnel. With this construction, the seal member can be easily prevented from falling off from the stationary funnel or the movable funnel.

Yet another aspect of a preferred embodiment involves the vehicle described above, wherein the seal member is elastically deformable and includes a first portion having a first axial length and a second portion having a second axial length that is less than the first axial length. With such an arrangement, the seal member can be easily stretched at the second portion. Thus, the seal member can be easily attached to either the stationary funnel or the movable funnel.

Still another aspect of a preferred embodiment involves the vehicle described above, wherein the first engagement surface is defined by a projection and the second engagement surface is defined by a recess. Preferably, the seal member is elastically deformable and includes a first portion having a first axial length and a second portion having a second axial length that is less than the first axial length. The recess is formed in the first axial portion. With this construction, the recess can be easily formed in the seal member.

Another aspect of a preferred embodiment involves the vehicle described above, wherein a plurality of the movable funnels are formed integrally via a shaft. The seal member is elastically deformable and includes a first portion and a second portion having an axial length that is less than the axial length of the first portion. The shaft of the movable funnels is radially aligned with the second portion of the seal member.

Yet another aspect of a preferred embodiment involves the vehicle described above, wherein the seal member comprises a seal portion for contact with one of the stationary funnel and the movable funnel in multiple directions. With this construction, air leakage through the gap between the movable funnel and the stationary funnel can be reduced or eliminated when the movable funnel cooperates with the stationary funnel.

Still another aspect of a preferred embodiment involves the vehicle described above, wherein the seal portion includes a first seal portion extending in a direction perpendicular to an axial direction of the seal member and a second seal portion extending in the axial direction of the seal member. With this construction, the gap between the movable funnel and the stationary funnel can be sealed in two ways, that is, in the axial direction of the seal member and in a direction perpendicular to the axial direction.

BRIEF DESCRIPTION OF THE DRAWINGS

These and other features, aspects and advantages of the present invention are described below with drawings of preferred embodiments of the invention, which are intended to illustrate, but not to limit, the present invention. The drawings contain twenty-seven (27) figures.

FIG. 1 is a side view showing a motorcycle having certain features, aspects and advantages of an embodiment of the present invention.

FIG. 2 is a plan view of an air intake arrangement and the surrounding area of the motorcycle of FIG. 1.

FIG. 3 is a side view of the air intake arrangement and the surrounding area of the motorcycle of FIG. 1.

FIG. 4 is a cross sectional view of an attachment of an air filter to an air cleaner box of the motorcycle of FIG. 1.

FIG. 5 is a rear view of the air intake arrangement and the surrounding area of the motorcycle of FIG. 1. The air intake arrangement includes a plurality of stationary funnels and a plurality of movable funnels.

FIG. 6 is a perspective view of the air intake arrangement of FIG. 5 with the movable funnels separated from the stationary funnels.

FIG. 7 is a side view of the air intake arrangement of FIG. 5 illustrating a funnel moving mechanism.

FIG. 8 is a side view of a parallel linkage of the funnel moving mechanism of FIG. 7.

FIG. 9 is a perspective view of the air intake arrangement of FIG. 5 with the movable funnels contacting the stationary funnels.

FIG. 10 is a side view of the funnel moving mechanism with the movable funnels in their contacting positions.

FIG. 11 is a side view of the parallel linkage with the movable funnels in their contacting positions.

FIG. 12 is a plan view of the detailed structure of the air intake arrangement and surrounding area of the motorcycle of FIG. 1

FIG. 13 is a rear view of stationary funnels of the motorcycle of FIG. 1.

FIG. 14 is a cross sectional view of the attachment structure of the stationary funnels shown in FIG. 13 to a throttle body.

FIG. 15 is a cross sectional view of the attachment structure of the stationary funnels shown in FIG. 13 to the throttle body, with the components separated from one another.

FIG. 16 is an enlarged cross sectional view of the surrounding area of a guide member of the motorcycle of FIG. 1.

FIG. 17 is a rear view of the movable funnels of the motorcycle of FIG. 1.

FIG. 18 is a perspective view of a seal member of the air intake arrangement of the motorcycle of FIG. 1.

FIG. 19 is a plan view of the seal member of FIG. 18.

FIG. 20 is a perspective view of the structure of the movable funnels of the motorcycle of FIG. 1.

FIG. 21 is a cross sectional view of the detailed structure of the seal member of the motorcycle of FIG. 1.

FIG. 22 is a cross sectional view of the detailed structure of the seal member of FIG. 21, with the movable funnel in contact with the stationary funnel.

FIG. 23 is a perspective view of a modification of the seal member of FIG. 21.

FIG. 24 is a plan view of the seal member shown in FIG. 23.

FIG. 25 is a perspective view of the structure of movable funnels configured for use with the seal member of FIG. 23.

FIG. 26 is a partial cross sectional view of the detailed structure of the seal member shown in FIG. 23.

FIG. 27 is a side view of the detailed structure of the seal member shown in FIG. 23.

DETAILED DESCRIPTION OF THE PREFERRED EMBODIMENTS

FIG. 1 is a side view of a motorcycle having certain features, aspects and advantages of an embodiment of the present invention. FIGS. 2 to 22 illustrate the detailed structure of a funnel and a seal member of the motorcycle shown in FIG. 1. In the description herein, a motorcycle is taken as an example of the vehicle of the present invention; however, the air intake arrangement may be applied to other vehicles as well. In the drawings, "FWD" indicates the forward or running direction of the motorcycle. The structure of the motorcycle is described with reference to FIGS. 1 to 22.

As shown in FIG. 1, the motorcycle of the first embodiment has a head pipe 1 and a main frame 2 with its front end connected to the head pipe 1. As shown in FIG. 2, the main frame 2 is branched to extend leftward and rightward with respect to the forward direction of the vehicle body (FWD direction indicated by the arrow). The main frame 2 is provided with an air intake passage 2a for introducing air into an air cleaner box 24 described below. As shown in FIG. 1, the main frame 2 is formed to extend rearward and downward. A seat rail 3 extends rearward and upward and is connected to the main frame 2. A steering mechanism 4 is attached to the head pipe 1 for rotational movement. Handlebars 5 are attached to an upper portion of the steering mechanism 4. A clutch lever 6 is attached to the handlebars 5. A front fork 7 is attached to a lower part of the steering mechanism 4. A front wheel 8 is rotatably mounted at the lower end of the front fork 7.

The front end of a swing arm 10 is attached to the rear end of the main frame 2 via a pivot shaft 9. A rear wheel 11 is rotatably mounted at the rear end of the swing arm 10. A fuel tank 12 is disposed above the main frame 2, and a seat 13 is disposed above the seat rail 3. An engine 14 is mounted below the main frame 2.

As shown in FIG. 3, the engine 14 includes a piston 15, a cylinder 16, a cylinder head 17 and a throttle body 18. The piston 15 is fitted in the cylinder 16, and the cylinder head 17 closes one opening of the cylinder 16. The cylinder head 17 is formed with an intake port 17a and an exhaust port 17b. The intake port 17a is provided to supply a mixture of air and fuel to a combustion chamber 16a of the cylinder 16. The exhaust port 17b is provided to exhaust a residual gas from the combustion chamber 16a of the cylinder 16 after combustion. The intake port 17a and the exhaust port 17b are provided with an intake valve 19a and an exhaust valve 19b, respectively. The throttle body 18 is attached to an opening of the intake port 17a. An injector 20 for injecting fuel into the intake port 17a is attached to the throttle body 18. An exhaust pipe 21 is attached to an opening of the exhaust port 17b, and a muffler 22 (see FIG. 1) is connected to the exhaust pipe 21. Although only one cylinder 16 is shown in FIG. 3, four cylinders 16 are actually provided at predetermined intervals in the width direction of the vehicle body. That is, the engine 14 of the first embodiment is a four-cylinder type. However, other numbers of cylinders may be provided as well.

As shown in FIG. 1, the front side of the vehicle body is covered by a front cowl 23, which includes an upper cowl 23a and a lower cowl 23b. As shown in FIGS. 1 and 2, an air cleaner box 24 for receiving air supplied from the air intake passage 2a of the main frame 2 is disposed between the left and right branches of the main frame 2. As shown in FIGS. 2 and 3, an air filter 25 is disposed in the air cleaner box 24 to filter air supplied from the air intake passage 2a of the main frame 2. As shown in FIG. 3, the air filter 25 is secured by being interposed between an upper box portion 24a and a lower box portion 24b of the air cleaner box 24. Specifically, the front part of the air filter 25 is secured by being interposed by a pressing portion 24c of the upper box portion 24a and a support portion 24d of the lower box portion 24b. As shown in FIGS. 2 and 4, the longitudinal center of the air filter 25 is screwed with a screw 60, or other fastener, (see FIG. 4) to a screw hole 24e (see FIG. 4) of the upper box portion 24a and a screw hole 24f of the lower box portion 24b. As shown in FIG. 3, a contacting portion 25a at the rear portion of the air filter 25 is secured by being interposed between a guide member 31 to be described later and the lower box portion 24b.

As shown in FIGS. 3 and 5, a stationary funnel 26 and a movable funnel 27 are provided in the air cleaner box 24. Preferably, the stationary funnel 26 and the movable funnel 27 are constructed from a resin-based material, such as a plastic. However, other suitable materials may also be used. As shown in FIG. 3, an injector 28 is attached to an upper portion of the air cleaner box 24. The injector 28 is provided to inject fuel into the intake port 17a, together with the injector 20, when the engine 14 is rotating at a high speed. The injector 28 is disposed above the movable funnel 27. A funnel moving mechanism 29 is screwed to a rear portion of the air cleaner box 24 from the outside.

One stationary funnel 26 and one movable funnel 27 are provided for each cylinder 16 of the engine 14. The stationary funnel 26 is secured to the air cleaner box 24, and introduces filtered air in the air cleaner box 24 to the intake port 17a. The movable funnel 27 is disposed on the inlet side of the stationary funnel 26, and has a function of introducing filtered air in the air cleaner box 24 to the intake port 17a, in cooperation with the stationary funnel 26.

As shown in FIGS. 6 to 11, the movable funnel 27 is movable between the spaced position (shown in FIGS. 6 to 8) at which its opening 27a on the stationary funnel 26 side is spaced apart from an opening 26a of the stationary funnel 26 on the inlet side, and the contacting position (shown in FIGS. 9 to 11) at which the opening 27a of the movable funnel 27 is in contact with the opening 26a of the stationary funnel 26. Here, as shown in FIG. 3, when the movable funnel 27 is in the spaced position (shown in FIGS. 6 to 8), the intake pipe extending from the air cleaner box 24 to the cylinder 16 is made up of the stationary funnel 26, the throttle body 18 and the intake port 17a. On the other hand, when the movable funnel 27 is in the contacting position (shown in FIGS. 9 to 11), the intake pipe extending from the air cleaner box 24 to the cylinder 16 is made up of the movable funnel 27, the stationary funnel 26, the throttle body 18 and the intake port 17a.

As shown in FIGS. 12 and 13, two adjacent stationary funnels 26 are integrated together via a connection 26b. That is, the first embodiment includes two parts 30, each integrating two adjacent stationary funnels 26 together. As shown in FIG. 12, each part 30, integrating two stationary funnels 26 together, has three screw insertion holes 26c for insertion of screws 61 (see FIG. 14). As shown in FIG. 14, the stationary funnels 26 (part 30) are attached to the air cleaner box 24 and the throttle body 18 with the screws 61 inserted into the screw insertion holes 26c. The air cleaner box 24 is also formed with screw insertion holes 24g for insertion of the screws 61. An engagement portion 26d is formed on the inner surface of the screw insertion hole 26c of the stationary funnels 26 (part 30). With this construction, as shown in FIG. 15, a head 61a of the screw 61 can be engaged with the engagement part 26d before the screw 61 is attached to the throttle body 18. Thus, the screw 61 can be prevented from slipping upward out of the screw insertion hole 26c. As shown FIGS. 12 and 13, a support column 26e is formed integrally with the part 30 integrating two stationary funnels 26 together. As shown in FIG. 13, the support column 26e is formed with a pair of rotary shaft support holes 26f for supporting ends of rotary shafts 41 described below for rotational movement.

As shown in FIG. 6, a guide member 31 is attached to the support columns 26e of the two parts 30. A fixation part 31b having a fixation hole 31a is provided at both ends of the guide member 31. As shown in FIG. 12, the guide member 31 is screwed at the fixation holes 31a (see FIG. 6) to the air cleaner box 24 (see FIG. 2) with screws 62. As shown in FIGS. 6 and 12, the fixation parts 31b are each formed with a cylindrical portion 31c projecting upward. As shown in FIG. 16, the cylindrical portions 31c formed at both ends of the guide member 31 are respectively inserted into insertion holes 26g of the support columns 26e of the part 30 via rubber members 32. That is, the guide or positioning member 31 operates to regulate the attachment positions of the two parts 30. With this construction, changes in the interval between the two parts 30 in the axial direction of the guide member 31 can be restricted.

As shown in FIG. 3, the guide member 31 also functions as a guide when attaching the air filter 25 to the air cleaner box 24. Specifically, the air filter 25 can be attached to the air cleaner box 24 by holding the air filter 25 with the contacting portion 25a (preferably, a generally hook-shaped portion) at the rear part thereof in contact with the guide member 31 and then rotating the air filter 25 about the guide member 31 in P direction of FIG. 3. The guide member 31 also has a function of preventing the rear part of the air filter 25 from coming upward out of position when the air filter 25 is attached to the air cleaner box 24.

In the first embodiment, as shown in FIGS. 12 and 17, two adjacent movable funnels 27 are integrated together via a pair of support shafts 27b (see FIG. 17). That is, the first embodiment includes two parts 33, each integrating two adjacent movable funnels 27 together. The support shaft 27b is disposed between the two movable funnels 27 of the part 33. The support shaft 27b is supported by a parallel linkage 42 described below so that the movable funnels 27 (part 33) are translatable. That is, the movable funnels 27 preferably define a substantially straight line between the contacting position and the spaced or separated position. As shown in FIG. 17, the support shaft 27b has a small diameter portion 27c.

A support shaft 27e having a small diameter portion 27d is provided on outer sides of the part 33 integrating two adjacent movable funnels 27 together. As shown in FIG. 12, the two parts 33, each integrating two movable funnels 27 together, are disposed such that their respective end surfaces of the small diameter portions 27d of the support shafts 27e are opposed to each other.

As shown in FIG. 8, a split bushing 34 is mounted on the small diameter portion 27c of the support shaft 27b (see FIG. 12) of the movable funnels 27 (part 33). The split bushing 34 has a function of allowing rotational movement of the parallel linkage 42 described below relative to the support shaft 27b.

As shown in FIG. 12, such a split bushing 34 is also mounted on the small diameter portions 27d of the support shafts 27e between the two parts 33, each integrating two movable funnels 27 together. Between the two parts 33 each integrating two movable funnels 27 together, only one split bushing 34 is mounted in such a manner as to cover the two small diameter portions 27d of the support shafts 27e.

In the first embodiment, as shown in FIGS. 5 and 7, a seal member 35 is mounted (secured) at the lower end of the movable funnel 27, which is on the stationary funnel 26 side. Preferably, the seal member 35 is made from rubber or another material, or combination of materials, suitable to create a seal between two components. As shown in FIGS. 18 and 19, the seal member 35 is formed with four engagement holes 35a as through holes. Four cylindrical projections 27f (see FIG. 20) of the movable funnel 27 are in engagement with the engagement holes 35a. The engagement hole 35a is an example of a structure that defines an "engagement surface" and a "recess" of the present invention. The projection 27f is an example of a structure that defines an "engagement surface" and a "projection" of the present invention. The engagement surfaces are configured to create a pair of cooperating interference surfaces that contact one another to create a force tending to resist movement of the seal member 35 in a direction separating from the funnel to which the seal member 35 is secured. As shown in FIG. 19, the four engagement holes 35a of the seal member 35 are each formed to extend at a predetermined angle ($\alpha°$=approximately 45°) with respect to a radial direction of the seal member 35 (R direction indicated by the arrow). As shown in FIG. 20, the four projections 27f of the movable funnel 27 are also each formed to extend at a predetermined angle (approximately 45°) with respect to the radial direction of the movable funnel 27 (seal member 35), as with the four engagement holes 35a. The four projections 27f of the movable funnel 27 extend in a direction perpendicular to a direction in which two movable funnels 27 are disposed adjacently, or aligned.

In the first embodiment, as shown in FIG. 18, the seal member 35 is formed with a recess 35b on its inner peripheral surface. A flange or flange-like projection 27g (see FIG. 20) formed at the bottom of the movable funnel 27 is in engagement with the recess 35b. The recess 35b is an example of a structure defining an "engagement surface" and a "recess" of the present invention. The projection 27g is an example of a structure defining an "engagement portion" and a "projection" of the present invention.

That is, in the first embodiment, the seal member 35 can be inhibited or prevented from slipping off (falling off or becoming disengaged) from the lower end of the movable funnel 27 by engagement of the engagement holes 35a with the projections 27f and of the recess 35b with the projection 27g.

In the first embodiment, as shown in FIG. 21, the seal member 35 is formed with a first seal portion 35c extending laterally (radially (perpendicularly with respect to its axis) and a tubular second seal portion 35d extending downward (axially). When the movable funnel 27 translates from the spaced position (shown in FIG. 21) to the contacting position (shown in FIG. 22), the first seal portion 35c comes into contact with the stationary funnel 26 to block the gap between the movable funnel 27 and the stationary funnel 26. Also, the first seal portion 35c is elastically deformed upward so that the second seal portion 35d also comes into contact with the stationary funnel 26 to block the gap between the movable funnel 27 and the stationary funnel 26. That is, the seal member 35 has a double seal structure.

In the first embodiment, as shown in FIGS. 7 and 10, the funnel moving mechanism 29 uses a parallel linkage 42 described below to translate the movable funnel 27 between the spaced position (shown in FIGS. 6 and 7) and the contacting position (shown in FIGS. 9 and 10).

In a specific structure of the funnel moving mechanism 29, as shown in FIGS. 6 and 12, an end of the rotary shaft 41 is rotatably supported by the rotary shaft support hole 26f (see FIG. 13) of the support column 26e provided to the stationary funnels 26 (part 30).

As shown in FIG. 12, a parallel linkage 42 is attached to the one and the other ends of the rotary shaft 41 so as to move rotationally together therewith. As shown in FIGS. 6 and 8, the parallel linkage 42 includes an upper link lever 43 attached to the upper rotary shaft 41 for rotational movement thereabout and a lower link lever 44 attached to the lower rotary shaft 41 for rotational movement thereabout.

As shown in FIG. 7, the upper link lever 43 has a fitting part 43a and a rotary shaft insertion hole 43b. As shown in FIGS. 6 and 8, the fitting part 43a of the upper link lever 43 receives the upper support shaft 27b (small diameter portion 27c) of the movable funnel 27 via the split bushing 34. With this construction, the upper link lever 43 is rotationally movable relative to the upper support shaft 27b.

As shown in FIGS. 8 and 11, the upper rotary shaft 41 is inserted into the rotary shaft insertion hole 43b of the upper link lever 43 so that the upper link lever 43 moves rotationally together with the upper rotary shaft 41. As shown in FIG. 12, a link lever 43c is disposed between the parts 33 each integrating two movable funnels 27. The link lever 43c has a fitting part 43a (see FIGS. 7 and 10) and a rotary shaft insertion hole 43b similar to those of the upper link lever 43.

As shown in FIG. 8, the lower link lever 44 has a fitting part 44a, a rotary shaft insertion hole 44b and two stops or stoppers 44c and 44d. The fitting part 44a of the lower link lever 44 receives the lower support shaft 27b (small diameter portion 27c) of the movable funnel 27 via the split bushing 34. With this construction, the lower link lever 44 is rotationally movable relative to the lower support shaft 27b. The lower rotary shaft 41 is inserted into the rotary shaft insertion hole 44b of the lower link lever 44 so that the lower link lever 44 rotates together with the lower rotary shaft 41. As shown in FIG. 8, the stopper 44c of the lower link lever 44 has a function of regulating rotational movement of the lower link lever 44 in an A direction by coming into contact with the support column 26e of the stationary funnel 26 when the lower link lever 44 has moved rotationally by a predetermined amount in the A direction (when the movable funnel 27 has reached the spaced position). Also, as shown in FIG. 11, the stopper 44d of the lower link lever 44 has a function of regulating rotational movement of the lower link lever 44 in a B direction by coming into contact with the support column 26e of the stationary funnel 26 when the lower link lever 44 has moved rotationally by a predetermined amount in the B direction (when the movable funnel 27 has reached the contacting position).

As shown in FIG. 9, the lower rotary shaft 41 is provided with a support part 45 for rotational movement together therewith. The support part 45 is made up of a pair of holding pieces 45b each formed with a cutout 45a.

With the support part 45 and the parallel linkage 42 constructed as described above, as shown in FIGS. 7 and 8, when the support part 45 (see FIG. 7) is rotationally moved in the A direction to rotationally move the parallel linkage 42 (see FIG. 8) in the A direction, the movable funnel 27 is translated away from the stationary funnel 26. Also, as shown in FIGS. 10 and 11, when the support part 45 (see FIG. 10) is rotationally moved in the B direction to rotationally move the parallel linkage 42 (see FIG. 11) in the B direction, the movable funnel 27 is translated closer to the stationary funnel 26. Here, as shown in FIGS. 8 and 11, the amount of rotational movement of the parallel linkage 42 is adjusted such that the position of the opening end of the movable funnel 27 on the side of the opening 26a of the stationary funnel 26 is substantially the same as viewed in the opening direction of the stationary funnel 26 (along its axis) between when the movable funnel 27 is in the spaced position (shown in FIG. 8) and when it is in the contacting position (shown in FIG. 11). With this construction, even when the opening 27a of the movable funnel 27 is spaced apart from the opening 26a of the stationary funnel 26 while the engine 14 is rotating at a high speed, air can flow linearly through the movable funnel 27 into the stationary funnel 26 and hence an increase in air flow resistance can be avoided. As a result, a decrease in air intake efficiency can be avoided while the engine 14 is rotating at a high speed (when the movable funnel 27 is spaced apart from the stationary funnel 26).

As shown in FIG. 12, the parallel linkage 42, which includes the upper link lever 43 (see FIG. 6) and the lower link lever 44, is moved rotationally by the driving force of a motor 46 disposed outside of the air cleaner box 24 (see FIG. 3).

Specifically, the motor 46 is disposed on the rear side of the movable funnel 27 in the running direction of the vehicle (FWD direction indicated by the arrow). As shown in FIG. 7, one end of a rotary lever 47 is attached to an output shaft 46a of the motor 46. The other end of the rotary lever 47 is formed with an insertion hole 47a.

The rotary lever 47 is disposed inside the air cleaner box 24. A projection 48a provided on both sides of a movable member 48 is attached to the insertion hole 47a of the rotary lever 47 so as to be pivotable relative to the insertion hole 47a. One end of a movable shaft 49 is disposed inside the movable member 48. Only one movable shaft 49 is provided.

As shown in FIG. 12, the movable shaft 49 is disposed between the two parts 33 (movable funnels 27). As shown in FIG. 7, a support shaft 51 is provided at the other end of the movable shaft 49. The cutout 45a of the support part 45, which moves rotationally together with the rotary shaft 41, is in engagement with the support shaft 51.

When the rotary lever 47 is rotationally moved in the C direction (as shown in FIG. 7) by the driving force of the motor 46, the movable member 48 moves in the D direction, which in turn rotationally moves the parallel linkage 42 in the A direction.

On the other hand, when the rotary lever 47 is rotationally moved in the E direction by the driving force of the motor 46 as shown in FIG. 10, the movable member 48 moves in the F direction, which in turn rotationally moves the parallel linkage 42 in the B direction.

With reference to FIGS. 3, 7 and 10, a description is provided of how the length of the intake pipe is changed between when the engine 14 is rotating at a high speed and when it is rotating at a low speed.

When the engine 14 shown in FIG. 3 is rotating at a high speed, the intake pipe is shortened so that a pulsation effect can be easily obtained. That is, the movable funnel 27 is translated to its spaced position when the engine 14 is rotating at a high speed. By utilizing the pulsation effect, the intake efficiency can be improved by adjusting the length of the intake pipe such that high-pressure pulses come closer to the vicinity of the intake valve.

Specifically, first of all, as shown in FIG. 7, the rotary lever 47 is rotationally moved in the C direction by the motor 46 of the funnel moving mechanism 29 to move the movable member 48 in the D direction. This moves the movable shaft 49 in the D direction, which in turn rotationally moves the parallel linkage 42 (see FIG. 8) in the A direction. After that, the parallel linkage 42 is kept rotationally moving in the A direction until the stopper 44c of the lower link lever 44 comes into contact with the support column 26e as shown in FIG. 8.

This causes the movable funnel 27 to be moved to the spaced position with the opening end of the opening 27a of the movable funnel 27 kept in parallel to the opening end of the opening 26a of the stationary funnel 26. As a result, when the engine 14 (see FIG. 3) is rotating at a high speed, the intake pipe is made up of the stationary funnel 26, the throttle body 18 (see FIG. 3) and the intake port 17a (see FIG. 3) and hence can be shortened. Here, when the intake pipe is shortened when the engine 14 shown in FIG. 3 is rotating at a high speed, high-pressure pulses can easily reach the opening of the intake port 17a on the cylinder 16 side when the intake valve 19a opens, thereby improving the intake efficiency.

When the engine 14 shown in FIG. 3 is rotating at a low speed, the intake pipe is lengthened so that the pulsation effect can be easily obtained. That is, the movable funnel 27 is translated to its contacting position when the engine 14 is rotating at a low speed.

Specifically, first of all, as shown in FIG. 10, the rotary lever 47 is rotationally moved in the E direction by the motor 46 of the funnel moving mechanism 29 to move the movable member 48 in the F direction. This moves the movable shaft 49 in the F direction, which in turn rotationally moves the parallel linkage 42 (see FIG. 11) in the B direction. After that, the parallel linkage 42 is kept rotationally moving in the B direction until the stopper 44d of the lower link lever 44 comes into contact with the support column 26e as shown in FIG. 11.

This causes the movable funnel 27 to be moved to the contacting position with the opening end of the opening 27a of the movable funnel 27 kept in parallel to the opening end of the opening 26a of the stationary funnel 26. As a result, when the engine 14 (see FIG. 3) is rotating at a low speed, the intake pipe is made up of the movable funnel 27, the stationary funnel 26, the throttle body 18 (see FIG. 3) and the intake port 17a (see FIG. 3) and hence can be lengthened. Here, when the intake pipe is lengthened when the engine 14 shown in FIG. 3 is rotating at a low speed, high-pressure pulses can easily reach the opening of the intake port 17a on the cylinder 16 side when the intake valve 19a opens, thereby improving the intake efficiency.

In the first embodiment, as described above, a seal member 35 is provided between the stationary funnel 26 and the movable funnel 27. Thus, air leakage through the gap between the movable funnel 27 and the stationary funnel 26 can be reduced or eliminated when the movable funnel 27 is moved to the stationary funnel 26 side (in the contacting position). With this construction, a desired amount of air can be supplied to the intake port 17a. In addition, the movable funnel 27 is formed with projections 27f and a projection 27g, and the seal member 35 is formed with engagement holes 35a and a recess 35b for engagement with the projections 27f and 27g, respectively, to prevent the seal member 35 from falling off from the movable funnel 27. Thus, the seal member 35 can be prevented from falling off from the movable funnel 27 without providing a separate member specifically for that purpose. With this construction, it is possible to prevent the seal member 35 and the member for preventing the seal member 35 from falling off from the movable funnel 27 from entering the inside of the engine 14, thereby preventing damage to the engine 14. It will be appreciated that, although referred to as a "contacting position" between the movable funnel 27 and the stationary funnel 26; the funnels do not necessary come into direct contact with one another. For instance, in the illustrated arrangement, the seal member 35 provides contact between the stationary funnel 26 and the movable funnel 26. Furthermore, alternative arrangements are possible wherein the funnels remain in contact with one another at all times, even while moving relative to one another to vary a length of the intake passage, such as by a sliding or telescoping arrangement, for example.

In the first embodiment, the movable funnel 27 is formed with a flange-like projection 27g. Therefore, the projection 27g and the recess 35b can be tightly engaged with each other by inserting the projection 27g into the recess 35b. Thus, the seal member 35 can be more reliably prevented from falling off from the movable funnel 27.

In the first embodiment, the movable funnel 27 is formed with four cylindrical (boss-like) projections 27f, and the seal member 35 is formed with four engagement holes 35a for receiving the projections 27f therein. Therefore, the projections 27f and the engagement holes 35a can be tightly engaged with each other by inserting the projections 27f into the engagement holes 35a. Thus, the seal member 35 can be more reliably prevented from falling off from the movable funnel 27.

In the first embodiment, the boss-like projections 27f of the movable funnel 27 are formed to extend at a predetermined angle (approximately 45°) with respect to a radial direction of the seal member 35 (R direction indicated by the arrow), and the engagement holes 35a of the seal member 35 are also formed to extend at a predetermined angle ($\alpha°$=approximately 45°) with respect to the radial direction of the seal member 35 (R direction indicated by the arrow) correspondingly to the projections 27f. Thus, even when the seal member 35 expands radially, the expanding direction of the seal member 35 is at the predetermined angle ($\alpha°$=approximately 45°) with respect to the extending direction of the projections 27f and the engagement holes 35a, and hence the projections 27f can be more reliably prevented from coming disengaged from the engagement holes 35a. In addition, since the projections 27f are formed to extend in a direction at the predetermined angle (approximately 45°) with respect to the radial direction of the seal member 35 (R direction indicated by the arrow), enlargement of the projections 27f in radial directions of the seal member 35 can be avoided while the area of engagement between the projections 27f and the engagement holes 35a can be increased.

In the first embodiment, since the engagement holes 35a are formed as through holes, it is easy to check whether or not the projections 27f are inserted into the engagement holes 35a by a visual inspection from the outside.

In the first embodiment, two movable funnels 27 are integrated together, and the bosses, or boss-like projections 27f, are formed to extend in a direction perpendicular to a direction in which the two movable funnels 27 are disposed adjacently or aligned with one another. Thus, in the case where the two movable funnels 27 are integrally molded using a split mold, since the split line of the mold extends perpendicularly to the direction in which the two movable funnels 27 are disposed adjacently, the split line of the mold extends in the same direction as the extending direction of the projections 27f. With this construction, the projections 27f can be easily formed in a cylindrical shape (e.g., a boss-like shape).

In the first embodiment, the seal member 35, which is secured to the movable funnel 27, can smooth the passage of air to be supplied to the stationary funnel 26 when the movable funnel 27 is spaced apart from the stationary funnel 26 (when the engine 14 is rotating at a high speed). Thus, air can be smoothly supplied to the engine 14. With this construction, a decrease in engine 14 output can be avoided.

In the first embodiment, the seal member 35 is formed with a first seal portion 35c formed to extend in a radial direction relative to the seal member 35, and a tubular second seal portion 35d extends in the axial direction of the seal member 35. Thus, air leakage through the gap between the movable funnel 27 and the stationary funnel 26 can be reduced or eliminated when the movable funnel 27 is moved to the stationary funnel 26 side (in the contacting position).

FIGS. 23 to 27 illustrate the detailed structure of a seal member and a movable funnel of a motorcycle according to a second embodiment of the present invention. As described with reference to FIGS. 23 to 27, the second embodiment is different from the first embodiment described above in that the seal part is formed with a portion, or portions, having a reduced axial length compared to other portions or the remainder of the seal part.

In the second embodiment, as in the first embodiment, a rubber seal member 85 (see FIG. 23) is mounted (secured) at the lower end of the movable funnel 77 (see FIG. 25). As shown in FIGS. 23 and 24, the seal member 85 is formed with four engagement holes 85a as through holes, as in the first embodiment. Four cylindrical projections 77f (see FIG. 25) of the movable funnel 77 are in engagement with the engagement holes 85a. The engagement hole 85a is an example of a structure defining an "engagement portion" and a "recess" of the present invention. The projection 77f is an example of a structure defining an "engagement portion" and a "projection" of the present invention.

As shown in FIG. 23, the seal member 85 is formed with a recess 85b on its inner peripheral surface, as in the first embodiment. A flange-like projection 77g (see FIG. 25) formed at the bottom of the movable funnel 77 is in engagement with the recess 85b. The recess 85b is an example of a structure defining an "engagement portion" and a "recess" of the present invention. The projection 77g is an example of a structure defining an "engagement portion" and a "projection" of the present invention.

As shown in FIG. 26, the seal member 85 is formed with a first seal portion 85c extending laterally (radially) and a tubular second seal portion 85d extending downward (axially).

In the second embodiment, as shown in FIG. 23, the seal member 85 is formed with a thick portion, or a first portion 85e with a first axial length and a recessed thin portion, or second portion 85f with a second axial length that is less than the axial length of the first portion 85e. As shown in FIG. 27, a lower part of the support shafts 77b and 77e of the movable funnel 77 is disposed in the recessed part of the second portion 85f. The support shaft 77b is an example of the "shaft part" of the present invention.

In the second embodiment, as shown in FIGS. 25 and 26, the movable funnel 77 is formed with a recess 77h. As shown in FIG. 26, the seal member 85 is formed with a projection 85g for engagement with the recess 77h. With this construction, the seal member 85 can be more reliably prevented from coming off from the movable funnel 77.

The structure of the other part of the second embodiment is similar to that of the first embodiment. In the second embodiment, as described above, since the seal member 85 is formed with a second portion 85f that has a smaller axial length than the first portion 85e, the seal member 85 can be easily stretched at the second or thin portion 85f. Thus, the seal member 85 can be easily attached to the movable funnel 77.

The embodiment disclosed herein is intended to be illustrative in all respects, rather than restrictive. The scope of the present invention is defined by the appended claims, rather than the foregoing description of the embodiment, and is intended to include all modifications that fall within the meaning and scope equivalent to the appended claims. For example, although the present invention is applied to a motorcycle in the first and second embodiments described above, it is not limited thereto and may also be applied to vehicles other than motorcycles. In the first and second embodiments described above, the seal member is secured to the movable funnel. However, the present invention is not limited thereto, and the seal member may be secured to the stationary funnel.

In the first and second embodiments described above, the movable funnel is formed with four boss-like (cylindrical) projections for securing the seal member to the movable funnel. However, the present invention is not limited thereto, and the movable funnels may be formed with three or less, or five or more projections for that purpose.

In the first and second embodiments described above, the seal member is provided with a first seal portion and a second seal portion. However, the present invention is not limited thereto, and the seal member may be formed with a single seal portion.

In the first and second embodiments described above, the present invention is applied to a vehicle incorporating a four-cylinder engine. However, the present invention is not limited thereto and may also be applied to vehicles incorporating a multi-cylinder engine other than a four-cylinder one, vehicles incorporating a single-cylinder engine, and so forth.

In the first and second embodiments described above, two movable funnels are integrated together. However, the present invention is not limited thereto, and three or more movable funnels may be integrated together. Alternatively, a separate movable funnel may be provided for each cylinder.

In the first and second embodiments described above, the boss-like projections of the movable funnel are formed to extend at approximately 45° with respect to a radial direction of the seal member, and the engagement holes of the seal member are also formed to extend at approximately 45° with respect to the radial direction of the seal member. However, the present invention is not limited thereto, and the boss-like projections of the movable funnel may be formed to extend in a radial direction of the seal member, and the engagement holes of the seal member may also be formed to extend in the radial direction of the seal member. Alternatively, the boss-like projections of the movable funnel may extend at an angle other than approximately 45° with respect to a radial direction of the seal member, and the engagement holes of the seal member may also be formed to extend at the angle other than approximately 45° with respect to the radial direction of the seal member. In this case, the boss-like projections of the movable funnel can be sufficiently prevented from coming off out of the engagement holes of the seal member, if the projections are formed to extend at approximately 30° to 60° with respect to a radial direction of the seal member and the engagement holes of the seal member are also formed to extend at approximately 30° to 60° with respect to the radial direction of the seal member.

In the first and second embodiments described above, the movable funnel is translatable using a parallel link. However, the present invention is not limited thereto, and the movable funnel may be not provided with a parallel link and hence not translatable, but movable throughout an arcuate path.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present vehicle with air intake arrangement has been described in the context of particularly preferred embodiments, the skilled artisan will appreciate, in view of the present disclosure, that certain advantages, features and aspects of the vehicle with air intake arrangement may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A vehicle comprising:
   an engine having at least one intake port;
   at least one stationary funnel that introduces air into the at least one intake port of the engine;
   at least one movable funnel positioned on an inlet side of the at least one stationary funnel, at least a portion of the at least one movable funnel located external of the at least one stationary funnel and extending away from the at least one stationary funnel in a non-overlapping relationship, the at least one movable funnel capable of cooperating with the at least one stationary funnel to introduce air into the at least one intake port through a passage defined by a combination of the at least one movable funnel and the at least one stationary funnel and having an intake length greater than that of the at least one stationary funnel alone;
   a seal member that creates at least a substantial seal between the at least one stationary funnel and the at least one movable funnel when the at least one stationary funnel and the at least one movable funnel are in cooperation with one another; and
   a retention mechanism that retains the seal member to one of the stationary funnel and the movable funnel to inhibit disengagement of the seal member.

2. The vehicle of claim 1, wherein the retention mechanism comprises a first engagement surface defined by the one of the stationary funnel and the movable funnel, and a second engagement surface defined by the seal member, wherein the first engagement surface engages the second engagement surface to inhibit disengagement of the seal member from the one of the stationary funnel and the movable funnel.

3. The vehicle of claim 2, wherein the first engagement surface is defined by the movable funnel.

4. The vehicle of claim 2, wherein the first engagement surface is defined by at least one projection and the second engagement surface is defined by at least one recess.

5. The vehicle of claim 4, wherein the at least one projection comprises a flange extending from a side surface of the movable funnel and the at least one recess comprises an annular recess that accommodates the flange.

6. The vehicle of claim 4, wherein the at least one projection comprises a boss extending from a side surface of the movable funnel and the at least one recess accommodates the boss.

7. The vehicle of claim 6, wherein the seal member is elastically deformable and comprises a first portion that has a first axial length and a second portion that has a second axial length less than the first axial length, wherein the at least one recess is formed in the thick portion.

8. The vehicle of claim 6, wherein the stationary funnel, the movable funnel and the seal member are generally cylindrical in shape, the at least one recess is formed to extend at a predetermined angle with respect to a radial direction of the seal member and the boss extends in substantially the same direction as the at least one recess.

9. The vehicle of claim 6, wherein the at least one recess is a through hole extending completely through a wall thickness of the seal member.

10. The vehicle of claim 6, wherein the at least one intake port comprises a plurality of intake ports, the at least one stationary funnel and the at least one movable funnel comprises a stationary funnel and a movable funnel associated with each of the plurality of intake ports, wherein at least two of the movable funnels are integrally formed, and the boss extends in a direction perpendicular to a direction in which the movable funnels are aligned.

11. The vehicle of claim 10, wherein the integral movable funnels are interconnected by a shaft, the seal member is elastically deformable and comprises a first portion that has a first axial length and a second portion that has a second axial length less than the first axial length, wherein the shaft is radially aligned with the second portion.

12. The vehicle of claim 1, wherein the seal member is elastically deformable and comprises a first portion that has a first axial length and a second portion that has a second axial length less than the first axial length.

13. The vehicle of claim 1, wherein the seal member includes a seal portion that contacts the one of the at least one stationary funnel and the at least one movable funnel in multiple directions.

14. The vehicle of claim 13, wherein the seal portion comprises a first seal portion that extends in a direction substantially perpendicular to an axial direction of the seal member, and a second seal portion that extends substantially in the axial direction of the seal member.

15. A vehicle, comprising:
    an engine having at least one intake port;
    an air intake assembly that introduces intake air to the intake port, the air intake assembly comprising a stationary portion and a movable portion, wherein the movable portion is movable relative to the stationary portion to vary a length of the air intake assembly, the air intake assembly further comprising a motor configured to move the movable portion through a linkage during operation of the engine, wherein the movable portion is connected to the stationary portion when the engine is rotating at a first engine speed, and the movable portion is disconnected from the stationary portion when the engine is rotating at a second engine speed, which is higher than the first engine speed;
    a seal member secured to the air intake assembly to create at least a substantial seal between the stationary portion and the movable portion; and
    a retention mechanism that retains the seal member to the air intake assembly to inhibit separation of the seal member from the air intake assembly, wherein the retention mechanism comprises interference surfaces on each of the seal member and the air intake assembly that cooperate to create a force tending to resist relative movement of the seal member and the air intake assembly along an axis of the air intake assembly.

16. The vehicle of claim 15, wherein an outlet end of the movable portion is separable from an inlet end of the stationary portion.

17. The vehicle of claim 15, wherein the at least one intake port comprises a plurality of intake ports and one of the air intake assemblies is associated with each of the plurality of intake ports.

18. The vehicle of claim 15, wherein the seal member is secured to the movable portion of the air intake assembly.

19. The vehicle of claim 15, wherein the vehicle is a motorcycle.

* * * * *